(12) United States Patent
Mimatsu et al.

(10) Patent No.: US 8,806,657 B2
(45) Date of Patent: *Aug. 12, 2014

(54) METHOD AND APPARATUS FOR SETTING ACCESS RESTRICTION INFORMATION

(75) Inventors: Yasuyuki Mimatsu, Yokohama (JP); Kenichi Shimooka, Yokohama (JP); Masayuki Yamamoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 54 days.

This patent is subject to a terminal disclaimer.

(21) Appl. No.: 13/425,457

(22) Filed: Mar. 21, 2012

(65) Prior Publication Data

US 2012/0179888 A1 Jul. 12, 2012

Related U.S. Application Data

(63) Continuation of application No. 11/226,333, filed on Sep. 15, 2005, now Pat. No. 8,156,561, which is a continuation of application No. 10/787,112, filed on Feb. 27, 2004, now Pat. No. 7,373,670.

(30) Foreign Application Priority Data

Nov. 26, 2003 (JP) .................. 2003-395370

(51) Int. Cl.
*G06F 17/30* (2006.01)
*G06F 12/14* (2006.01)
*G06F 21/78* (2013.01)
*G06F 3/06* (2006.01)
*G06F 13/00* (2006.01)
*G06F 11/30* (2006.01)

(52) U.S. Cl.
CPC ............. *G06F 21/78* (2013.01); *G06F 3/0607* (2013.01); *G06F 3/0647* (2013.01); *G06F 3/0659* (2013.01); *Y10S 707/99939* (2013.01); *Y10S 707/9994* (2013.01)
USPC ................. 726/27; 707/999.009; 707/999.01; 711/163; 713/165; 713/166; 713/193

(58) Field of Classification Search
CPC ..... G06F 21/78; G06F 3/0607; G06F 3/0647; G06F 3/0659
See application file for complete search history.

(56) References Cited

U.S. PATENT DOCUMENTS 3,771,137 A 11/1973 Barner et al.
4,025,904 A 5/1977 Adney et al.
(Continued)

FOREIGN PATENT DOCUMENTS

EP 1 130 514 A2 9/2001
JP 9-288547 A 11/1997
(Continued)

OTHER PUBLICATIONS

White Paper; Network Attached Storage in the Data Protection Environment, Presented by Sony Electronics, Feb. 2002.

(Continued)

*Primary Examiner* — Cordelia Zecher
*Assistant Examiner* — Trang Doan
(74) *Attorney, Agent, or Firm* — Mattingly & Malur, PC

(57) ABSTRACT

The storage system includes a host computer; a management computer coupled to the host computer; a first storage device coupled to the host computer and the management computer, and including first port management information; and a second storage device coupled to the host computer, the management computer and the first storage device, and including second port management information. The first port management information and the second port management information include an identifier of a port on each storage device, an identifier of a volume in each storage device, an access restriction and an identifier of a port permitted access from the host computer to each storage device.

2 Claims, 14 Drawing Sheets

(56) References Cited

U.S. PATENT DOCUMENTS

| | | | |
|---|---|---|---|
| 5,155,845 A | 10/1992 | Beal et al. |
| 5,408,465 A | 4/1995 | Gusella et al. |
| 5,459,857 A | 10/1995 | Ludlam et al. |
| 5,504,882 A | 4/1996 | Chai et al. |
| 5,548,712 A | 8/1996 | Larson et al. |
| 5,680,580 A | 10/1997 | Beardsley et al. |
| 5,680,640 A | 10/1997 | Ofek et al. |
| 5,758,118 A | 5/1998 | Choy et al. |
| 5,835,954 A | 11/1998 | Duyanovich et al. |
| 5,870,537 A | 2/1999 | Kern et al. |
| 5,895,485 A | 4/1999 | Loechel et al. |
| 5,917,723 A | 6/1999 | Binford |
| 5,956,750 A | 9/1999 | Yamamoto et al. |
| 5,978,890 A | 11/1999 | Ozawa et al. |
| 6,012,123 A | 1/2000 | Pecone et al. |
| 6,098,129 A | 8/2000 | Fukuzawa et al. |
| 6,108,748 A | 8/2000 | Ofek et al. |
| 6,173,374 B1 | 1/2001 | Heil et al. |
| 6,219,753 B1 | 4/2001 | Richardson |
| 6,230,239 B1 | 5/2001 | Sakaki et al. |
| 6,240,486 B1 | 5/2001 | Ofek et al. |
| 6,240,494 B1 | 5/2001 | Nagasawa et al. |
| 6,247,099 B1 | 6/2001 | Skazinski et al. |
| 6,247,103 B1 | 6/2001 | Kern et al. |
| 6,343,324 B1 | 1/2002 | Hubis et al. |
| 6,356,977 B2 | 3/2002 | Ofek et al. |
| 6,446,141 B1 | 9/2002 | Nolan et al. |
| 6,446,175 B1 | 9/2002 | West et al. |
| 6,457,139 B1 | 9/2002 | D'Errico et al. |
| 6,484,173 B1 | 11/2002 | O'Hare et al. |
| 6,490,659 B1 | 12/2002 | McKean et al. |
| 6,523,096 B2 | 2/2003 | Sanada et al. |
| 6,529,976 B1 | 3/2003 | Fukuzawa et al. |
| 6,553,408 B1 | 4/2003 | Merrell et al. |
| 6,553,417 B1 | 4/2003 | Gampper |
| 6,598,134 B2 * | 7/2003 | Ofek et al. .................. 711/162 |
| 6,640,278 B1 | 10/2003 | Nolan et al. |
| 6,640,291 B2 | 10/2003 | Fujibayashi et al. |
| 6,647,474 B2 | 11/2003 | Yanai et al. |
| 6,647,476 B2 | 11/2003 | Nagasawa et al. |
| 6,654,830 B1 | 11/2003 | Taylor et al. |
| 6,654,831 B1 | 11/2003 | Otterness et al. |
| 6,675,258 B1 | 1/2004 | Bramhall et al. |
| 6,681,303 B1 | 1/2004 | Watanabe et al. |
| 6,681,339 B2 | 1/2004 | McKean et al. |
| 6,684,310 B2 | 1/2004 | Anzai et al. |
| 6,708,232 B2 | 3/2004 | Obara |
| 6,745,281 B1 | 6/2004 | Saegusa |
| 6,799,255 B1 | 9/2004 | Blumenau et al. |
| 6,816,948 B2 | 11/2004 | Kitamura et al. |
| 6,826,778 B2 | 11/2004 | Bopardikar et al. |
| 6,850,959 B1 * | 2/2005 | Golds ........................ 707/822 |
| 6,851,020 B2 | 2/2005 | Matsumoto et al. |
| 6,883,064 B2 | 4/2005 | Yoshida et al. |
| 7,039,870 B2 | 5/2006 | Takaoka et al. |
| 7,162,575 B2 | 1/2007 | Dalal et al. |
| 7,272,848 B1 | 9/2007 | Meyer et al. |
| 7,409,391 B2 | 8/2008 | O'Hare et al. |
| 7,506,040 B1 | 3/2009 | Rabe et al. |
| 7,606,239 B2 | 10/2009 | Maveli et al. |
| 2001/0020254 A1 | 9/2001 | Blumenau et al. |
| 2001/0050915 A1 | 12/2001 | O'Hare et al. |
| 2001/0052018 A1 | 12/2001 | Yokokura |
| 2002/0004857 A1 | 1/2002 | Arakawa et al. |
| 2002/0019920 A1 | 2/2002 | Reuter et al. |
| 2002/0019922 A1 | 2/2002 | Reuter et al. |
| 2002/0019923 A1 | 2/2002 | Reuter et al. |
| 2002/0026558 A1 | 2/2002 | Reuter et al. |
| 2002/0029326 A1 | 3/2002 | Reuter et al. |
| 2002/0133735 A1 | 9/2002 | McKean et al. |
| 2002/0147802 A1 | 10/2002 | Murotani et al. |
| 2002/0156887 A1 | 10/2002 | Hashimoto |
| 2002/0194294 A1 | 12/2002 | Blumenau et al. |
| 2002/0194523 A1 | 12/2002 | Ulrich et al. |
| 2003/0037071 A1 | 2/2003 | Harris et al. |
| 2003/0051109 A1 | 3/2003 | Cochran |
| 2003/0056038 A1 | 3/2003 | Cochran |
| 2003/0097607 A1 | 5/2003 | Bessire |
| 2003/0101228 A1 | 5/2003 | Busser et al. |
| 2003/0110157 A1 | 6/2003 | Maki et al. |
| 2003/0115432 A1 | 6/2003 | Biessener et al. |
| 2003/0126327 A1 | 7/2003 | Pesola et al. |
| 2003/0140193 A1 * | 7/2003 | Acharya et al. ............... 711/112 |
| 2003/0145168 A1 | 7/2003 | LeCrone et al. |
| 2003/0145169 A1 | 7/2003 | Nagasawa et al. |
| 2003/0158999 A1 | 8/2003 | Hauck et al. |
| 2003/0167419 A1 | 9/2003 | Yanai et al. |
| 2003/0172069 A1 * | 9/2003 | Uchiyama et al. ................ 707/9 |
| 2003/0182525 A1 | 9/2003 | O'Connell et al. |
| 2003/0200387 A1 | 10/2003 | Urabe et al. |
| 2003/0204597 A1 | 10/2003 | Arakawa et al. |
| 2003/0212781 A1 | 11/2003 | Kaneda et al. |
| 2003/0212854 A1 | 11/2003 | Kitamura et al. |
| 2003/0212860 A1 | 11/2003 | Jiang et al. |
| 2003/0221077 A1 | 11/2003 | Ohno et al. |
| 2004/0003022 A1 | 1/2004 | Garrison et al. |
| 2004/0049553 A1 | 3/2004 | Iwamura et al. |
| 2004/0054850 A1 | 3/2004 | Fisk |
| 2004/0054866 A1 * | 3/2004 | Blumenau et al. ............. 711/202 |
| 2004/0064610 A1 | 4/2004 | Fukuzawa et al. |
| 2004/0064641 A1 | 4/2004 | Kodama |
| 2004/0111485 A1 * | 6/2004 | Mimatsu et al. ............... 709/213 |
| 2004/0123180 A1 | 6/2004 | Soejima et al. |
| 2004/0139240 A1 | 7/2004 | DiCorpo et al. |
| 2004/0143832 A1 | 7/2004 | Yamamoto et al. |
| 2004/0148443 A1 | 7/2004 | Achiwa |
| 2004/0172510 A1 | 9/2004 | Nagashima et al. |
| 2004/0193827 A1 | 9/2004 | Mogi et al. |
| 2004/0230980 A1 | 11/2004 | Koyama et al. |
| 2004/0260875 A1 | 12/2004 | Murotani et al. |
| 2004/0260966 A1 | 12/2004 | Kaiya et al. |
| 2005/0010743 A1 | 1/2005 | Tremblay et al. |
| 2005/0081009 A1 | 4/2005 | Williams et al. |

FOREIGN PATENT DOCUMENTS

| | | | |
|---|---|---|---|
| JP | 10-508967 T | 9/1998 |
| JP | 10-283272 A | 10/1998 |
| JP | 11-184641 A | 7/1999 |
| JP | 2000-293317 A | 10/2000 |
| JP | 2001-067187 A | 3/2001 |
| JP | 2002-157091 A | 5/2002 |
| JP | 2002-157211 | 5/2002 |
| JP | 2002-230246 A | 8/2002 |
| JP | 2002-259214 | 9/2002 |
| JP | 2002-312127 | 10/2002 |
| JP | 2003-067268 | 3/2003 |
| JP | 2003-141055 | 5/2003 |
| JP | 2003-324437 | 11/2003 |
| JP | 2003-330622 | 11/2003 |
| WO | 9709676 | 3/1997 |

OTHER PUBLICATIONS

SCSI-3 Fault Tolerant Controller Configurations Utilizing SCC & New Event Codes, Editor: Steve Sicola, High Availability Study Group, Document No. X3T10 95-312r3, Rev. 3.0, Feb. 28, 1996.

* cited by examiner

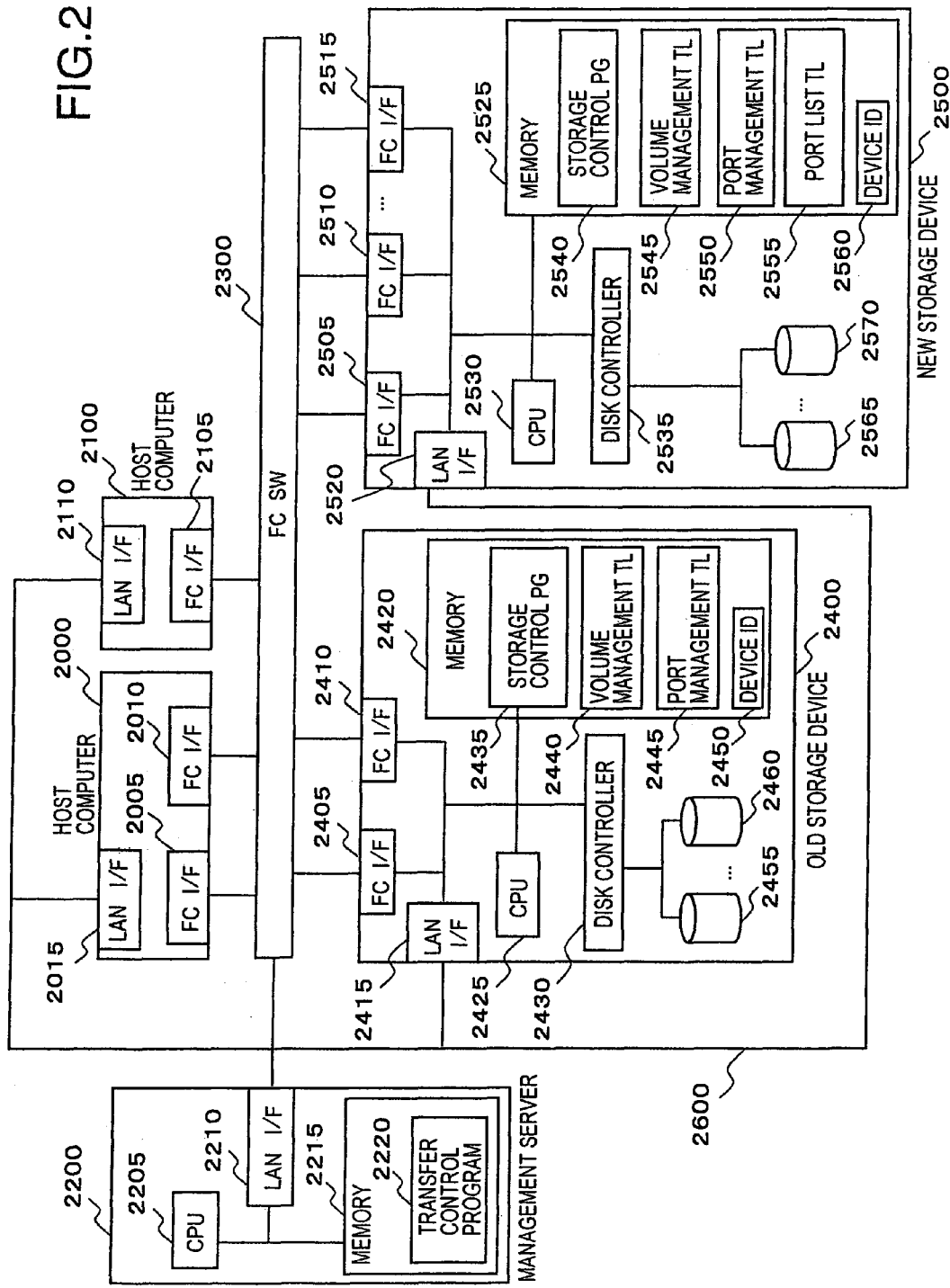

FIG.3

VOLUME MANAGEMENT TL 2440

| VOLUME NUMBER 244005 | VOLUME ID 244010 |
|---|---|
| 1 | Vol.1 |
| 2 | Vol.2 |
| 3 | Vol.3 |
| 4 | Vol.4 |
| : | : |

FIG.4

PORT MANAGEMENT TL 2445

| PORT WWN 244505 | LUN 244510 | VOLUME ID 244515 | ACCESS RESTRICTION 244520 | ACCESS PERMISSION WWN 244525 |
|---|---|---|---|---|
| S1a | 0 | Vol.1 | YES | H1a |
|  | 1 | Vol.2 | YES | H1b, H2 |
| S1b | 0 | Vol.3 | YES | H1a, H2 |
|  | 1 | Vol.1 | YES | H1b |
|  | 2 | Vol.4 | YES | H1a, H2 |
| : | : | : | : | : |

FIG.5

PORT LIST TL 2555

| PORT WWN | TYPE | TARGET PORT PATH DEFINITION |
|---|---|---|
| S2a | TARGET | YES |
| S2b | TARGET | YES |
| S2c | TARGET | NO |
| S2d | TARGET | NO |
| S2e | INITIATOR | — |
| S2f | INITIATOR | — |
| S2g | INITIATOR | — |
| : | : | : |

255505 — PORT WWN
255510 — TYPE
255515 — TARGET PORT PATH DEFINITION

FIG.6

VOLUME MANAGEMENT TL 2545

| VOLUME NUMBER 254505 | VOLUME ID 254510 | TYPE 254515 | INITIATOR PORT WWN 254520 | EXTERNAL PORT WWN 254525 | EXTERNAL CONNECTION LUN 254530 | EXTERNAL DEVICE ID 254535 | EXTERNAL VOLUME ID 254540 |
|---|---|---|---|---|---|---|---|
| 1 | Vol.1' | INTERNAL | — | — | — | — | — |
| .. | .. | .. | .. | .. | .. | .. | .. |
| N | Vol.N' | INTERNAL | — | — | — | — | — |
| N+1 | Vol. N+1' | EXTERNAL | S2e | S1a | 0 | Storage1 | Vol.1 |
|  |  |  | S2f | S1b | 1 |  |  |
| N+2 | Vol.N+2' | EXTERNAL | S2e | S1a | 1 | Storage1 | Vol.2 |
| N+3 | Vol.N+3' | EXTERNAL | S2f | S1b | 0 | Storage1 | Vol.3 |
| N+4 | Vol.N+4' | EXTERNAL | S2f | S1b | 2 | Storage1 | Vol.4 |
| .. | .. | .. | .. | .. | .. | .. | .. |

FIG.8

CONNECTION CORRESPONDENCE TL 575

| INITIATOR PORT WWN | EXTERNAL PORT WWN | EXTERNAL CONNECTION LUN | EXTERNAL DEVICE ID | EXTERNAL VOLUME ID |
|---|---|---|---|---|
| S2e | S1a | 0 | Storage1 | Vol.1 |
| | S1a | 1 | Storage1 | Vol.2 |
| S2f | S1b | 0 | Storage 1 | Vol.3 |
| | S1b | 1 | Storage 1 | Vol.1 |
| | S1b | 2 | Storage 1 | Vol.4 |
| : | : | : | : | : |

FIG.9

PORT MANAGEMENT TL 2550

| PORT WWN | LUN | VOLUME ID | ACCESS RESTRICTION | ACCESS PERMISSION WWN |
|---|---|---|---|---|
| : | : | : | : | : |
| S2c | 0 | Vol.N+1' | | H1a |
| | 1 | Vol.N+2' | | H1b, H2 |
| S2d | 0 | Vol.N+3' | | H1a, H2 |
| | 1 | Vol.N+1' | | H1b |
| | 2 | Vol.N+4' | | H1a, H2 |
| : | : | : | : | : |

FIG.12

MOUNT POINT TL 2035

| DEVICE FILE | MOUNT POINT |
|---|---|
| /dev /dsk /c0t0d0 | /usr /bin |
| /dev /dsk /c0t1d0 | /usr /share |
| : | : |

FIG.13

PORT MANAGEMENT TL 2550

| PORT WWN | ACCESS PERMISSION WWN | ACCESS RESTRICTION | LUN | VOLUME ID |
|---|---|---|---|---|
| S2a | Hx | YES | 0 | Vol.X |
|  | Hy | YES | 0 | Vol.Y |
| : | : | : | : | : |
| S2c | H1a | YES | 0 | Vol.N+1' |
|  | H1b, H2 | YES | 1 | Vol.N+2' |
| S2d | H1a, H2 | YES | 0 | Vol.N+3' |
|  |  |  | 2 | Vol.N+4' |
|  | H1b | YES | 1 | Vol.N+1' |
| : | : | : | : | : |

FIG.15

CONFIGURATION INFORMATION TL 5000

| HOST WWN | STORAGE WWN | LUN | DEVICE ID | VOLUME ID |
|---|---|---|---|---|
| H1a | S1a | 0 | Storage1 | Vol .1 |
| | S1b | 0 | Storage1 | Vol .3 |
| | S1b | 2 | Storage1 | Vol .4 |
| H1b | S1a | 1 | Storage1 | Vol .2 |
| | S1b | 1 | Storage1 | Vol .1 |
| H2 | S1a | 1 | Storage1 | Vol .2 |
| | S1b | 0 | Storage1 | Vol .3 |
| | S1b | 2 | Storage1 | Vol .4 |
| ⋮ | ⋮ | ⋮ | ⋮ | ⋮ |

| LUN | H1a | H1b | H2 |
|---|---|---|---|
| 0 | O | | |
| 1 | | O | O |

| LUN | H1a | H1b | H2 |
|---|---|---|---|
| 0 | O | | O |
| 1 | | O | |
| 2 | O | | O |

METHOD AND APPARATUS FOR SETTING ACCESS RESTRICTION INFORMATION

CROSS-REFERENCES

This application is a continuation application of U.S. Ser. No. 11/226,333, filed Sep. 15, 2005, which is a continuation application of U.S. Ser. No. 10/787,112, filed Feb. 27, 2004, now U.S. Pat. No. 7,373,670, the entire contents of which are hereby incorporated by reference.

BACKGROUND OF THE INVENTION

This invention relates to a technology which sets up access restriction information on a storage device.

Utilization of computer systems has been advanced in many fields such as commerce and entertainment, and various data such as texts, sounds, still pictures, and motion pictures has been computerized. As a result of that, there is a tendency that the amount of data which is stored on a storage device of a computer, represented by a disk array device increases rapidly, and a storage device has been changed to one of large-scale. Also, in the field of highly public financial institutions and electronic commerce etc., which depends upon computer systems, it is required not only to have high capacity and high performance but also to continue operation of a storage device for 24 hours, and for 365 days. In case of unavoidably stopping it because of a system maintenance work and so on, it is necessary to shorten down time as much as possible.

As an example of the system maintenance work, cited is a case of introducing a new storage device into a computer system. In case that the storage device (new storage device) to be introduced is connected to a host computer, and data on an existing storage device (old storage device) is relocated to the new storage device, since there is a necessity that a connection of the host computer and the old storage device is cut off once, and data is copied from the old storage device to the new storage device, the operation of the computer system is stopped. In order to copy massive data from the large-scale old storage device, there is a necessity to stop the system for a long time.

In pages 18 to 20, FIGS. 1 and 3 of Japanese Patent Publication No. H10-508967 of Japanese translation of PCT international patent application (hereinafter, referred to as Patent Document 1), disclosed is a method of shortening down time of a system at the time of data transfer work, by carrying out a data transfer process during a period of system operation. In this method, the host computer and the new storage device are connected, and furthermore, the new storage device and the old storage device are connected. The new storage device copies data on the old storage device to its own storage area. The new storage device accepts an access request from the host computer to the data even in the copy operation, and if data of a destination of the access exists in its own storage area, the data is accessed. In case that it does not exist in its own storage area, firstly, the data is copied from the old storage device, and then, it is accessed. In this operation with the new storage device, it becomes possible to continuously operate the system even in a data transfer working state.

SUMMARY OF THE INVENTION

In the meantime, in a storage area network environment in which a plurality of host computers and storage devices are connected to one another via a network, in many cases, the storage device has a function for holding a list of host computers which are permitted to access the storage device, and for carrying out a selective access restriction. A technology which is described in the above-mentioned Patent Document 1 relates to data transfer from an old storage device to a new storage device, and does not consider an inheritance of the access restriction information which is set up on the old storage device, to the new storage device. For example, there is a case of changing from a system configuration in which the host computer directly accesses the old storage device to a system configuration in which the host computer accesses the old storage device through the new storage device. In this case, in order to continue the access to the old storage device even after the system change, there is a necessity to inherit the access restriction information which is set up on the old storage device to the new storage device.

This invention has been developed in view of the above-described situation, and an object of this invention is to provide a technology for transferring the access restriction information of the old storage device has to the new storage device.

In order to solve the above-described problem, this invention sets up access restriction information which is set up on each port of an old storage device, on each port of a new storage device which is utilized for an access to the volume that the old storage device has or had.

For example, in a storage area network system having a storage device which determines right or wrong of an access request to a volume, in accordance with access restriction information which is set up on a port which received the request, and a host computer which transmits an access request to the storage device through a first network, the access restriction information is set up on the storage device. Firstly, through a second network, obtained are access restriction information and information of volumes which are set up on each port which a first storage device has. Also, through the second network, from a second storage device, obtained is attribute information including a port type and a status of utilization of each port that the second storage device has. And, then, on the basis of the obtained attribute information of each port that the second storage device has, selected is a port of the second storage device which is utilized for accesses to volumes which the first storage device has or had. And, on the basis of the obtained access restriction information and the obtained information of volumes of each port that the first storage device has, on a port of the selected second storage device, setup is access restriction information of a port of the first storage device to which a volume, of which the port of the selected second storage device is utilized for an access, is assigned.

According to this invention, on each port of a new storage device which is utilized for an access to an old storage device, set up is access restriction information which is set up on a port of an old storage device which is a destination of an access. On this account, on the new storage device, it becomes possible to inherit and carry out the access restriction that the old storage device has carried out.

BRIEF DESCRIPTION OF THE DRAWINGS

FIG. 1A is a view showing the storage area network environment before system change, and FIG. 1B is a view showing the storage area network environment after system change.

FIG. 2 is a schematic view of a storage area network management system to which a first embodiment of this invention is applied.

FIG. 3 is a view for illustrating a configuration of a volume management TL 2440 that an old storage device 2400 holds.

FIG. 4 is a view for illustrating a configuration of a port management TL 2445 that the old storage device 2400 holds.

FIG. 5 is a view for illustrating a configuration of a port list TL 2555 that a new storage device 2500 holds.

FIG. 6 is a view for illustrating a configuration of a volume management TL 2545 that the new storage device 2500 holds.

FIG. 8 is a view for illustrating a configuration of a connection correspondence management TL 2575 that the new storage device 2500 prepares.

FIG. 9 is a view for illustrating a configuration of a port management TL 2550 that the new storage device 2500 holds.

FIG. 12 is a view for illustrating a configuration of a mount point TL 2035 that the host computers 2000, 2100 have.

FIG. 13 is a view for illustrating a configuration of the port management TL 2550 of the new storage device 2500.

FIG. 15 is a view for illustrating a configuration of a configuration information TL 5000 that the management server 2200 prepares.

FIGS. 16A and 16B are a view for illustrating a correspondence TL that the management server 2200 prepares, FIGS. 16A and 16B show correspondence TLs which are prepared for ports having WWNs of "S1a", "S1b" of the port management TL 2445, respectively.

DETAILED DESCRIPTION OF THE PREFERRED EMBODIMENTS

Prior to explanation of each embodiment of this invention, an storage area network environment that each embodiment of this invention manages will be described. FIG. 1 is a view for illustrating a storage area network environment that each embodiment of this invention manages, and FIG. 1A shows the storage area network environment before system change, and FIG. 1B shows the storage area network environment after system change.

Figure 1A:
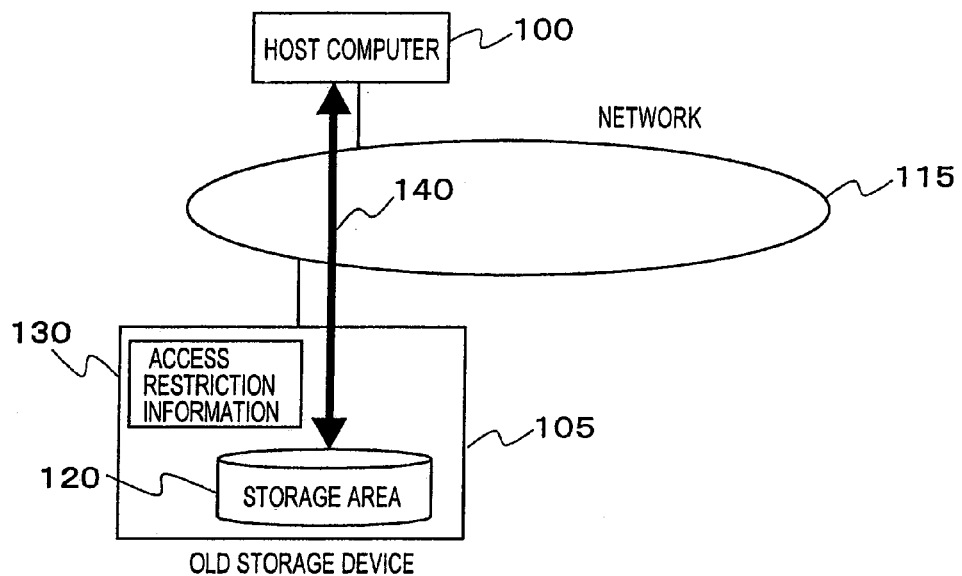
FIGS. 1A and 1B are a view for illustrating a storage area network environment that each embodiment of this invention manages.

As shown in FIG. 1A, in the storage area network environment before system change, a host computer 100 and an old storage device 105 having a storage area 120 are connected through a network 115. The host computer 100 directly accesses the storage area 120 of the old storage device 105, by way of a path 140. Access restriction information 130 is set up on the old storage device 105, and the old storage device 105 rejects an access to the storage area 120 from one other than the host computer 100, in accordance with this access restriction information 130.

Figure 1B:
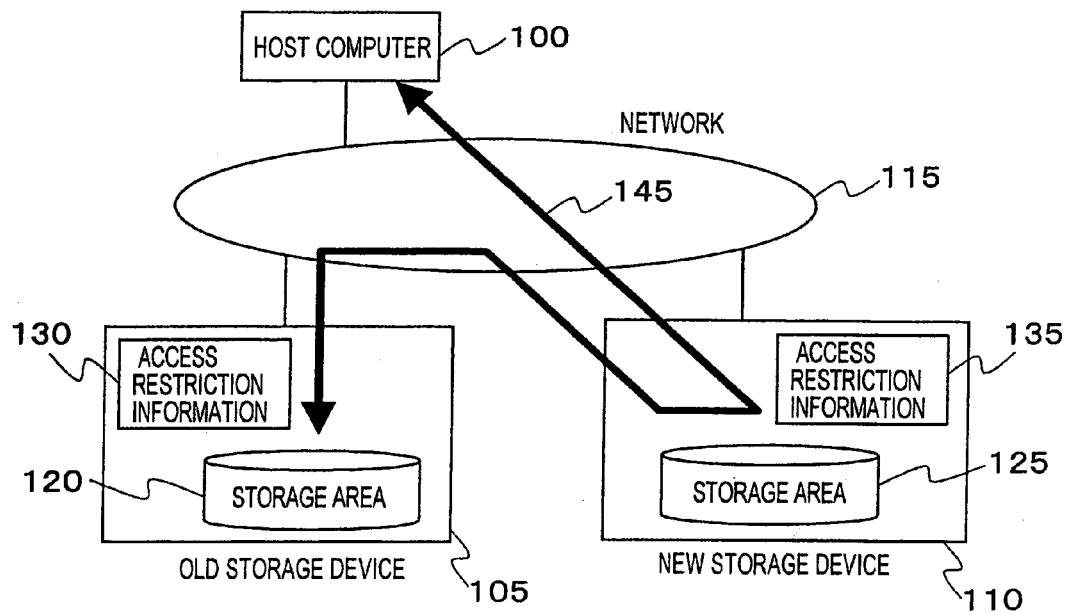

As shown in FIG. 1B, in the storage area network environment after system change, the host computer 100, the old storage device 105 having the storage area 120, and a new storage device 110 having a storage area 125 are connected through a network 115. The host computer 100 accesses the storage area 120 of the old storage device 105, through the new storage device 110, by way of a path 145. This means, a function that the new storage device 110 has is applicable to the storage area 120 that the old storage device 105 has. Also, data which is stored in the storage area 120 of the old storage device 105 may not be necessarily transferred to the storage area 125 of the new storage device 110.

Now, in order to transfer the storage area network environment as shown in FIG. 1A to the storage area network environment as shown in FIG. 1B, in each embodiment of this invention, prepared is an access path from the new storage device 110 to the storage area 120 of the old storage device 105, and the new storage device 110 is set up so as to relay an access request from the host computer 100 to the old storage device 105. Also, the access restriction information 130 which is set up on the old storage device 105 is inherited to the access restriction information 135 of the new storage device 110. The access restriction information 130 of the old storage device 105 is updated so as to reject an access to the storage area 120 from one other than the new storage device 110. In the following explanation, these processes are called as transfer process collectively.

<<First Embodiment>>

A first embodiment of this invention will be described, taking a case that a storage area network is built up on a Fibre Channel network as an example.

(1) System Configuration

FIG. 2 is a schematic view of a storage area network management system to which the first embodiment of this invention is applied.

As shown in the figure, the storage area network management system of this embodiment is configured in the manner that a management server 2200, a Fibre Channel switch (FC SW) 2300 which configures the storage area network, an old storage device 2400, a new storage device 2500, and host computers 2000, 2100 are connected to one another through a LAN 2600. On this account, a LAN interface (LAN I/F) for connecting to the LAN 2600 is disposed in the FC SW 2300, the management server 2200, the old storage device 2400, the new storage device 2500, and the host computers 2000, 2100. Although the LAN I/F of the FC SW 2300 is not shown in the figure, concretely speaking, the management server 2200 has a LAN I/F 2210, the old storage device 2400 has a LAN I/F 2415, the new storage device 2500 has a LAN I/F 2520, the host computer 2000 has a LAN I/F 2015, and the host computer 2100 has a LAN I/F 2110, respectively. In addition, if there is at least one host computer, it is sufficient.

The old storage device 2400, the new storage device 2500, and the host computers 2000, 2100 are connected to one another, through the FC SW 2300. In short, in this embodiment, the storage area network is built up on the Fibre Channel network. On this account, a Fibre Channel interface (FC I/F) for connecting to the FC SW 2300 is disposed on the old storage device 2400, the new storage device 2500, and the host computers 2000, 2100. Specifically, the old storage device 2400 has two FC SWs 2405, 2410, the new storage device 2500 has three or more FC I/Fs 2505, 2510, ..., 2515, the host computer 2000 has two FC I/Fs 2005, 2010, and the host computer 2100 has one FC I/F 2015, respectively. In this regard, however, the number of the FC I/Fs which is equipped with each device which configures the storage area network is not limited to what is shown in FIG. 2.

The FC I/F is used as a port of data transmission and reception, and has a unique identifier WWN (World Wide Name). In the following explanation, the FC I/F is simply called port. In addition, in order to distinguish a port that the host computer has and a port that the storage device has, there may be a case that they are called host port, storage port, respectively.

The host computers 2000, 2100 communicate with the storage devices 2400, 2500 by use of a communication protocol defined on a Fibre Channel protocol which is adopted by a Fibre Channel network, e.g., a standard SCSI protocol. By this, data, which is stored on the storage devices 2400, 2500, is read and written.

The old storage device 2400 is a storage device which is a transfer source of access restriction information. As shown in the figure, it has the LAN I/F 2415, the FC I/Fs 2405, 2410, a plurality of disk drives 2455, ..., 2460, a disk controller 2430, a CPU 2425, and a memory 2420. The disk controller 2430 controls a data transfer process to at least one disk volume which stores data. The disk volume is a logical storage area which is configured by at least one disk drive 2455, ..., 2460, and has a unique identifier on its own storage device. In the following explanation, the disk volume is simply called volume. A volume which is assigned to a port for transmitting data to and receiving data from the host computers 2000, 2100 has a LUN (Logical Unit Number) with respect to each port assigned. The host computers 2000, 2100, in case that they access a volume, identify the volume by designating a storage port and LUN. In the memory 2420, stored are a storage device control program (PG) 2435, a volume management table (TL) 2440, a port management table (TL) 2445, and a device ID 2450 which is letter string or numeral by which a storage device can be identified uniquely.

On the volume management TL 2440, registered is management information of a volume that the old storage device 2400 has. FIG. 3 is a view for illustrating a configuration of the volume management TL 2440 that an old storage device 2400 holds. As shown in the figure, on the volume management TL 2440, with respect to each volume that the old storage device 2400 has, registered are a volume number 244005 which is a sequential serial number which is given to a volume, and a volume ID 244010 which is an identifier for uniquely identifying a volume on the old storage device 2400. In an example shown in FIG. 3, as volume ID, letter strings such as "Vol. 1", "Vol. 2" are registered.

On the port management TL 2445, registered is management information of a port that the old storage device 2400 has. FIG. 4 is a view for illustrating a configuration of the port management TL 2445 that the old storage device 2400 has. As shown in the figure, on the port management TL 2445, with respect to each combination of a port that the old storage device 2400 has and a LUN which is assigned to the port, registered are WWN 244505 of the port, LUN 244510 which is assigned to the port and volume ID 244515, Yes (existing) or No (no-existing) of access restriction 244520 to a volume which is assigned to a port and a WWN 244525 of a source port of an access which is permitted to access a volume in case that the Yes/No of access restriction 244520 is "Yes". For example, in FIG. 4, for a volume whose volume ID is "Vol. 1", LUN "0" is assigned to a port having a WWN of "S1a". And it accepts only an access from a port having a WWN of "H1a". In this case, "H1a", "H1b", "H2", "S1a", "S1b" of FIG. 4 are WWNs of ports 2005, 2010, 2105, 2405, 2410 shown in FIG. 2, respectively. In addition, a content of registration of this volume management TL 2445 shows one of the old storage device 2400 before system change (status of FIG. 1A).

The storage device control PG 2435 is a program which controls an operation of the old storage device 2400. The CPU 2425 carries out, by executing the storage device control PG 2435 which is stored in the memory 2420, assignment of a port and LUN to each volume, input and output of data, communication with an external through the LAN I/F 2415, and access restriction on the basis of the port management TL 2445. Also, to a SCSI Inquiry command to each volume, device ID and volume ID are notified to a command transmission source.

The new storage device 2500 is a storage device which becomes a transfer destination of access restriction information, and has a function for relaying access requests from the host computers 2000, 2100 to the old storage device 2400. In the same manner as on the old storage device 2400, it has the LAN I/F 2520, a plurality of FC I/Fs 2505, 2510, ..., 2515, a plurality of disk drives 2565, ..., 2570, a disk controller 2535, a CPU 2530, and a memory 2525. Also, in the memory 2525, stored are a storage device control PG 2540, a volume management TL 2545, a port management TL 2550, a port list TL 2555, and a device ID 2560.

On the port list TL 2555, registered is attribute information of a port that the new storage device 2500 has. FIG. 5 is a view for illustrating a configuration of the port list TL 2555 that the new storage device 2500 has. As shown in the figure, on the port list TL 2555, with respect to each port that the new storage device 2500 has, registered are a port WWN 255505, a port type 255510, and Yes/No of a target port path definition 255515. In the port type 255510, registered is any one of a "target" or an "initiator". A port of the "target" shows a port for receiving an access request from another port to a volume. And, a port of the "initiator" shows a port for transmitting an access request to another port. In Yes/No of the target port path definition 255515, in case that the port type 255510 is "target", registered is whether a volume is assigned to the port or not. Yes/No of the target port path definition 255515 being "Yes" shows that a volume assigned exists, and "No" shows that a volume assigned does not exist.

On the volume management TL 2545, registered is management information of a volume that the new storage device 2500 has. FIG. 6 is a view for illustrating a configuration of the volume management TL 2545 that the new storage device 2500 has. As shown in the figure, on the volume management TL 2545, with respect to each volume that the new storage device 2500 has, registered are a volume number 254505 which is a sequential serial number which is given to a volume, a volume ID 254510 which is an identifier for uniquely identifying a volume on the new storage device 2500, a volume type 254515 which shows an existing position of a storage area of a volume, an initiator port WWN 254520, an external port WWN 254525, and an external connection LUN 254530, an external device ID 254535, and an external volume ID 254540. In case that the volume type 254515 is "internal", it shows that a storage area of a volume exists in the new storage device 2500, and in case that it is "external", it shows that a storage area of a volume exists in the old storage device 2400. That is, an access request from the host computers 2000, 2100 to a volume whose volume type 254515 is "external" is relayed to the old storage device 2400. In the initiator WWN 254520, the external port WWN 254525, the external connection LUN 254530, the external device ID 254535 and the external volume ID 254540, registered is information in case that the volume type 254515 is "external". In case of a volume of "internal", information is not registered. In the initiator port WWN 254520, registered is a WWN of an initiator port which is used on the occasion of relaying an access request from the host computers 2000, 2100 to the old storage device 2400. In the external port WWN 254525 and the external connection LUN 254530, registered are a WWN and a LUN of a port which is assigned on the old storage device 2400, to a volume on the old storage device 2400 which is a relay destination of an access request. On the external device ID 254535, a device ID of the old storage device 2400 is registered. And, in the external volume ID 254540, registered is a volume ID of a volume on the old storage device 2400 which is a relay destination of an access request. In an example shown in FIG. 6, on the new storage device 2500, a volume with a volume number "N+1" has a volume ID "Vol. N+1'", and a volume type is "external", and therefore, an access request to this volume is relayed to a volume on the old storage device 2400. The access request is relayed from an initiator port having a WWN of "S2e" to LUN "0" of a port having a WWN of "S1a", and is also relayed from an initiator port having a WWN of "S2f" to LUN "1" of a port having a WWN of "S1b". A device ID of the old storage device 2400 is "Storage 1", and a volume ID on the old storage device 2400 is "Vol. 1".

The port management TL 2550 registers management information of a port that the new storage device 2500 has, and has the same configuration as that of the port management TL 2445 as shown in FIG. 4 that the old storage device 2400 holds.

The storage device control PG 2540 is a program for controlling an operation of the new storage device 2500. The CPU 2530 realizes the same function as that of the storage device control PG 2435 of the old storage device 2400, by executing the storage device control PG 2540 which is stored in the memory 2525. In short, it carries out assignment of a port and LUN to each volume, input and output of data, communication with an external through the LAN I/F 2520, and access restriction on the basis of the port management TL 2550. Also, to a SCSI Inquiry command to each volume, device ID and volume ID are notified to a command transmission source. Furthermore, the CPU 2530 realizes the following function by executing the storage device control PG 2540. In short, on the basis of the volume management TL 2545, it relays an access request from the host computers 2000, 2100 to the old storage device 2400. Also, it scans an external disk volume which is connected to the initiator port. This scan process will be described in detail at later time.

The Fibre Channel switch 2300 has a plurality of ports (FC I/Fs) (not shown) for connecting to each port of the host computers 2000, 2100, the old storage device 2400, and the new storage device 2500, and has a communication function among these plurality of ports. Also, it has a zoning function for limiting the communication to inside of a specific port group (zone). It is possible to set up the zone from the management server 2200 through the LAN 2600. In a configuration before start of the transfer process (status shown in FIG. 1A), it is set up so as for the ports 2005, 2010, 2105, 2405, 2410 to be able to communicate with one another, i.e., so as for the host computers 2000, 2100 and the old storage device 2400 to be able to communicate with one another.

The management server 2200, as shown in the figure, has a LAN I/F 2210, a CPU 2205, and a memory 2215. In the memory 2215, a transfer control PG 2220 is stored. The transfer control PG 2220 is a program for carrying out a transfer process. The CPU 2205 executes the transfer control PG 2220 to perform reception of instruction from a user and transmission of instruction to the host computer 2000, 2100, the old storage device 2400, the new storage device and the FC SW 2300 via the LAN I/F 2210, thereby the transfer process is performed. In addition, as not particularly shown in the figure, the management server 2200 has an input/output device which becomes an interface that an administrator operates the transfer control PG 2220. An operation of the transfer control PG 2220 will be described in detail at later time.

(2) Procedure of Transfer Process

In case of changing a system configuration in which the host computers 2000, 2100 directly access the old storage device 2400, to a system configuration in which they access the old storage device 2400 through the new storage device 2500, a transfer process that the management server 2200 carries out will be described.

Figure 7:
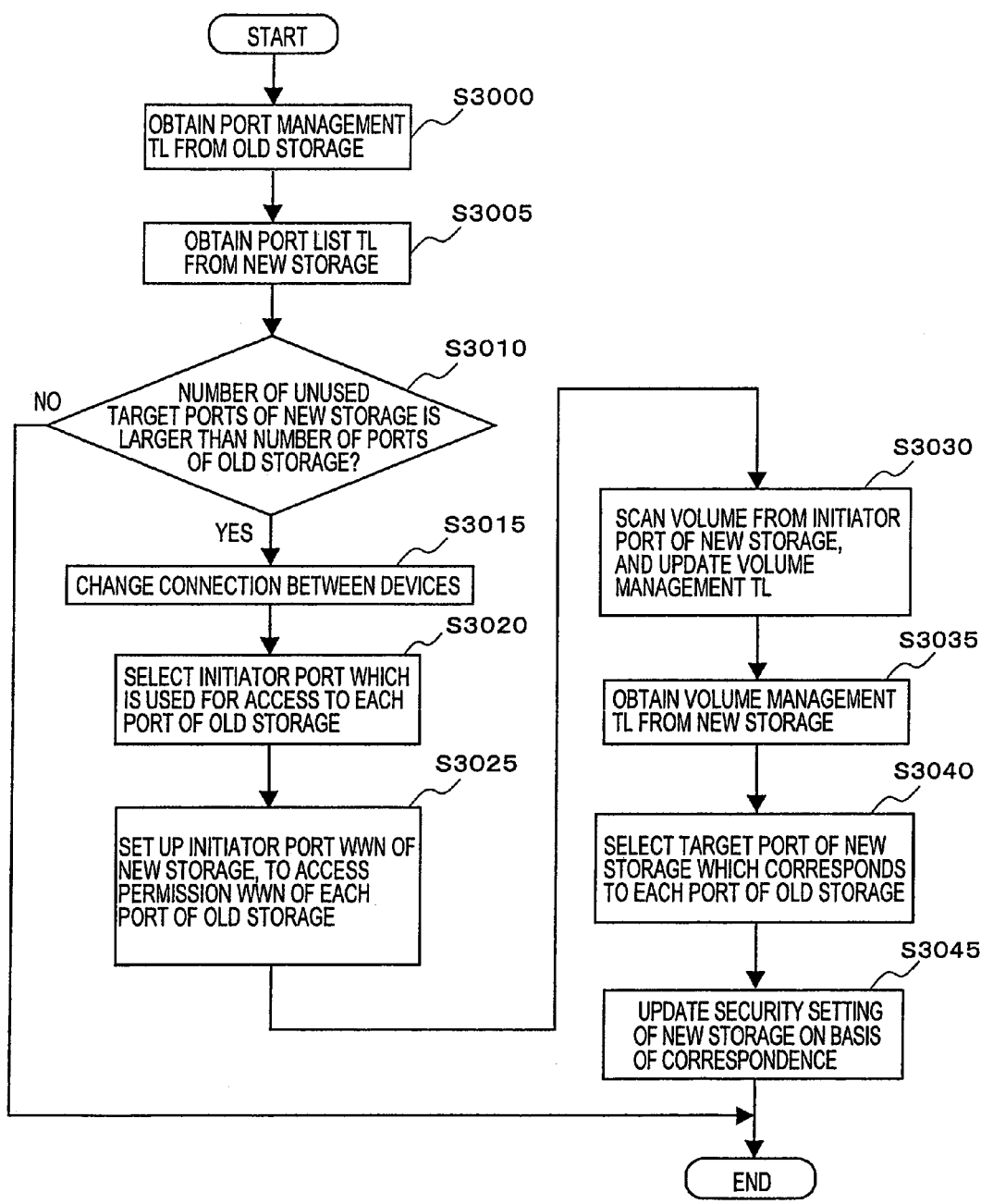
FIG. 7 is a flow chart for illustrating a transfer process that a management server 2200 carries out, in case of changing a system configuration in which host computers 2000, 2100 directly access the old storage device 2400, to a system configuration in which they access the old storage device 2400 through the new storage device 2500.

FIG. 7 is a flow chart for illustrating a transfer process that the management server 2200 carries out, in case of changing a system configuration in which the host computers 2200, 2100 directly access the old storage device 2400, to a system configuration in which they access the old storage device 2400 through the new storage device 2500. This flow is started with executing the transfer control PG 2220, in accordance with an instruction that the CPU 2205 of the management server 2200 accepted from an administrator.

Firstly, the management server 2200 obtains the port management TL 2445 from the old storage device 2400 (step S3000). Concretely speaking, the CPU 2205 of the management server 2200 transmits a port management TL request to the old storage device 2400 through the LAN I/F 2210. The CPU 2425 of the old storage device 2400, when it receives the port management TL request from the management server 2200 through the LAN I/F 2415, reads out the port management TL 2445 from the memory 2420, and transmits it to the management server 2200 through the LAN I/F 2415. The CPU 2205 of the management server 2200, when it receives the port management TL 2445 from the old storage device 2400 through the LAN I/F 2210, stores this in the memory 2215.

Next, the management server 2200 obtains the port list TL 2555 from the new storage device 2500 (step S3005). Concretely speaking, the CPU 2205 of the management server 2200 transmits a port list TL request to the new storage device 2500 through the LAN I/F 2210. The CPU 2530 of the old storage device 2500, when it receives the port list TL request from the management server 2200 through the LAN I/F 2520, reads out the port list TL 2555 from the memory 2525, and transmits it to the management server 2200 through the LAN I/F 2520. The CPU 2205 of the management server 2200, when it receives the port list TL 2555 from the new storage device 2500 through the LAN I/F 2210, stores this in the memory 2215.

Next, in the management server 2200, the CPU 2205 compares the number of the ports whose management information is stored on the port management TL 2445 of the old storage device 2400 which is stored in the memory 2215 with the number of ports whose port type 255510 is "target", the type 255510 being registered on the port list TL 2555 of the new storage device 2500 which is stored in the memory 2215, and whose target port path definition 255515 is "No" (step S3010). In a transfer process of this embodiment, on one port of the old storage device 2400, one target port of the new storage device 2500 is used. This is because, if a plurality of ports of the old storage device 2400 are integrated into one target port, there is a possibility that assignments of LUN to the target port overlap. Therefore, in case that the number of unused target ports of the new storage device 2500 is smaller than the number of ports of the old storage device 2400, a system configuration can not be changed. If (No in the step S3010), the transfer process is terminated. If not (Yes in the step S3010), a zone configuration of the FC SW 2300 is changed, so as to enable mutual communication between the two host computers 2000, 2100 and the new storage device 2500, and between the initiator port of the new storage device 2500 and the old storage device 2400 (step S3015). Concretely speaking, the CPU 2205 of the management server 2200 transmits zone configuration information to the FC SW 2300 through the LAN I/F 2210. The FC SW 2300 changes the zone configuration in accordance with the zone configuration information received from the management server 2200. In addition, in the structure that the FC SW is not used, it may be designed in the manner that the management server 2200 displays the zone configuration information for an administrator, and the administrator physically changes a cable connection in accordance with the displayed zone configuration information.

Next, in the management server 2200, with regard to each port which is registered on the port management TL 2445 of the old storage device 2400, the CPU 2205 selects one of the initiator ports from the port list TL 2555 of the new storage device 2500, and assigns the port to the old storage device 2400 (step S3020). It may be also designed in the manner that, on each port of the old storage device 2400, the CPU 2205 arbitrarily selects an initiator port of the new storage device 2500 from the port list TL 2555, or the port management TL 2445 and the port list TL 2555 are displayed for an administrator, and a designation of an initiator port of the new storage device 2500 which is assigned to each port of the old storage device 2400 may be accepted from the administrator. In addition, to a plurality of ports of the old storage device 2400, the same initiator port of the new storage device 2400 may be selected.

Next, in the management server 2200, with respect to each port of the old storage device 2400, the CPU 2205 transmits an instruction for changing WWN to be registered in the access permission WWN 244525 of a port of the port management TL 2445 that the old storage device 2400 holds WWN of an initiator port of the new storage device 2500 which is assigned to the port, on the old storage device 2400 through the LAN I/F 2210. The CPU 2425 of the old storage device 2400, when it receives this, updates the port management TL 2445 which is stored in the memory 2420, in accordance with the instruction (step S3025). On this occasion, if the access restriction 244520 of a record that WWN is registered in the access permission WWN 244525 is set up to "No", this is changed to "Yes". In this regard, however, in case that, by a zoning function etc. of the FC SW 2300, a port which can communicate with a port of the old storage device 2400 is limited to an initiator port of the new storage device 2500, the access restriction 244520 may be maintained as "No" without any change.

For example, in case of accessing a port of the old storage device 2400 having WWN of "S1a", from an initiator port of the new storage device 2500 having WWN of "S2e", "S2e" is registered in the access permission WWN 244525 of the record that "S1a" is recorded on the port WWN 244505 of the port management TL 2445. WWNs of "H1a", "H1b", "H2", which have already been registered, are deleted.

Next, the CPU 2205 of the management server 2200 transmits a volume management TL update request including designation of an initiator port of the new storage device 2500 which is selected in the step S3020, to the new storage device 2500 through the LAN I/F 2210. The CPU 2530 of the new storage device 2500, when it receives the volume management TL update request from the management server 2200 through the LAN I/F 2520, scans a volume of the old storage device 2400 which is accessible from the initiator port, with respect to each initiator port of the new storage device 2500 which is included in the request, and updates the volume management TL 2545 on the basis of a scan result (step S3030). Specifically, the CPU 2530 of the new storage device 2500, with respect to each initiator port of the new storage device 2500, by use of a function which is prepared in the Fibre Channel protocol adopted by the Fibre Channel network, scans a port of the old storage device 2400 which can communicate with the initiator port through the FC SW 2300. If it scans the port, it throws a predetermined command to each LUN through this port, and confirms a response. By this confirmation, accessible LUN is identified. When a LUN can be identified, an Inquiry command, which is defined in the Fibre Channel protocol, is transmitted to this LUN, and a device ID and a volume ID are obtained. And, by use of its result, the connection correspondence TL 2575 as shown in FIG. 8 is prepared.

In FIG. 8, in an entry 4000, WWN of the initiator port of the new storage device 2500 which is selected in the step S3020 is registered. In this example, in order to access each port of the old storage device 2400 having WWNs of "S1a", "S1b", initiator ports of the new storage device 2500 having WWNs of "S2e", "S2f" are registered. In an entry 4005, registered is a port of the old storage device 2400 which is accessible from an initiator port of the new storage device 2500 which is registered in the corresponding entry 4000. In an entry 4010, registered is a LUN which exists on a port of the old storage device 2400 which is registered in the corresponding entry 4005. And, in entries 4010, 4015, registered is a device ID, a volume ID which are obtained by having transmitted the Inquiry command to a LUN which is registered in the corresponding entry 4010.

Next, the CPU 2530 of the new storage device 2500 assigns a volume ID, with respect to each of a volume in the old storage device 2400 that a device ID is registered in the entry 4015 of the connection correspondence TL 2575, so as to be able to treat it on the new storage device 2500. In addition, as a result of volume scan, there is a case that the same volume with a plurality of paths are found. On the connection correspondence TL 2575 shown in FIG. 8, volumes having the same external device ID which is registered in the entry 4015 and the same external volume ID which is registered in the entry 4020 are treated as an identical volume also on the new storage device 2500, and therefore, there is no necessity to assign different volume IDs. For example, in FIG. 8, a volume of LUN "0" which is accessible from an initiator port having WWN of "S2e", and which exists in an external port having WWN of "S1a" has a device ID, a volume ID of "Storage 1", "Vol. 1", respectively, and is identical to a volume of LUN "1" which is accessible from an initiator port having WWN of "S2f", and which exists in an external port having WWN of "S1b".

Next, the CPU 2530 of the new storage device 2500 adds information of a volume to which a volume ID is assigned, to the volume management TL 2545 which is registered on the memory 2525. For example, in FIG. 6, a volume having a volume ID of "Vol. 2" on the old storage device 2400 has a volume ID of "Vol. N+2'" on the new storage device 2500, and is accessed from an initiator port having WWN of "S2e" as LUN "1" which exists in a port having WWN of "S1a".

Now, the CPU 2530 of the new storage device 2500, when update of the volume management TL 2545 which is registered on the memory 2525 is completed, it transmits this updated volume management TL 2545 through the LAN I/F 2520. And, the CPU 2205 of the management server 2200 obtains the volume management TL 2545 from the new storage device 2500 through the LAN I/F 2210 and stores it in the memory 2215 (step S3035).

Next, the CPU 2205 of the management server 2200, with respect to each port of the old storage device 2400 whose WWN is registered in the entry 244505 of the port management TL 2445 of the old storage device 2400, which is obtained in the step S3000, selects port WWN 255505 of a target port of the new storage device 2500 which Yes/No of the target port path definition 255515 is set up to "No", from the port list TL 2555 of the new storage device 2500, which is obtained in the step S3005 (step S3040). It may be also designed in the manner that the CPU 2205 arbitrarily selects a target port of the target port path definition of "No" from the port list TL 2555 for each port of the old storage device 2400, or the port management TL 2445 and the port list TL 2555 are displayed for an administrator, and designation of the target port path definition of "No" of the new storage device 2500, which is assigned to each port of the old storage device 2400, may be accepted from an administrator.

Next, the CPU 2205 of the management server 2200, with respect to each port of the old storage device 2400, which is registered on the port management TL 2445 obtained in the step S3000, transmits an instruction for copying the management information of the port in entries 244505 to 244525 of a target port of the new storage device 2500, which is registered on the port management TL 2550, and which corresponds to the port selected in the step S3040, to the new storage device 2500 through the LAN I/F 2210. On this occasion, a volume ID which is registered in the entry 244515 is, on the volume management TL 2545 which is obtained from the new storage device 2500 in the step S3035, changed to a volume ID of the new storage device 2500, which is registered in the entry 254510 of the record that the volume ID is registered in the entry 254540 as an external volume ID.

For example, on the port management TL 2445 shown in FIG. 4, with respect to each port of the old storage device 2400 having WWNs of "S1a", "S1b", when a target port of the new storage device 2500 having WWNs of "S2c" is selected, "S2d", respectively in the step S3040, as shown in FIG. 9, a content of each record having WWNs of "S1a", "S1b", respectively, of the port management TL 2445 shown in FIG. 4 is copied to each record having WWNs of "S2c", "S2d", respectively, of the port management TL 2550 of the new storage device 2500. In this regard, however, it is learned that the volume ID "Vol. 1" of the old storage device 2400 corresponds to "Vol. N+1'" on the new storage device 2500, by referring to correspondence of an external volume ID and a volume ID of the volume management TL 2545 obtained in the step S3035. On this account, "Vol. N+1" is registered in the volume ID 244515 of the port management TL 2550. Other volume IDs are changed in the same manner.

As above, information of an access path from the new storage device 2500 to a volume that the old storage device 2400 has is registered on the volume management TL 2545 of the new storage device 2500, and also, access restriction information to a volume that the port management TL 2445 of the old storage device 2400 has is transferred to the port management TL 2550 of the new storage device 2500.

The first embodiment of this invention has been described. As described above, according to this embodiment, it is possible to inherit access restriction information which is set up on the old storage device 2400 to the new storage device 2500. As a result of that, it is possible to carry out access restriction to a volume by utilizing an access restriction function of the new storage device 2500, even after a system configuration has been changed in the manner that the new storage device 2500 relays an access requests from the host computers 2000, 2100 as shown in FIG. 1B, from the configuration that the old storage device 2400 shown in FIG. 1A receives them directly. In addition, in this embodiment, in order to obtain a volume ID and a device ID, utilized is a response which corresponds to the Inquiry command, but another SCSI command such as Mode Sense etc. may be utilized.

Furthermore, in this embodiment, the storage area network is built up on the Fibre Channel network which uses a switch, but devices may be directly connected without a switch.

Also, this invention is not dependent upon a media or a protocol of a network. In this embodiment, it is assumed that the storage area network and the LAN 2600 are separated, and a high speed Fibre Channel network and an inexpensive network for control communication are used separately, but two networks may be united, and a common media and protocol may be used. In that case, it is possible to share a switch and a cable and cut down communication facilities. <<Second Embodiment>>

Next, a second embodiment of this invention will be described. This embodiment carries out a mount update process in which, in the above-described first embodiment, the host computers 2000, 2100 collect configuration information of the new storage device 2500, and updates a corresponding relation of a volume and a mount point of a file system in accordance with a changed system configuration, in case that access restriction functions that the old storage device 2400 and the new storage device 2500 provide are different from each other, and a format conversion process which a format of access restriction information to be inherited from the old storage device 2400 is converted in accordance with the new storage device 2500.

(1) System Configuration

A system configuration of this embodiment is the same as that of the first embodiment shown in FIG. 2. In this regard, however, host computers 2000, 2100 are different from those of the first embodiment. Also, it is different from the first embodiment on the point that access restriction of a storage port of the new storage device 2500 is set up with a group unit of host ports (in the first embodiment, LUN is a unit).

(1-1) Host Computer

Figures 10, 11:
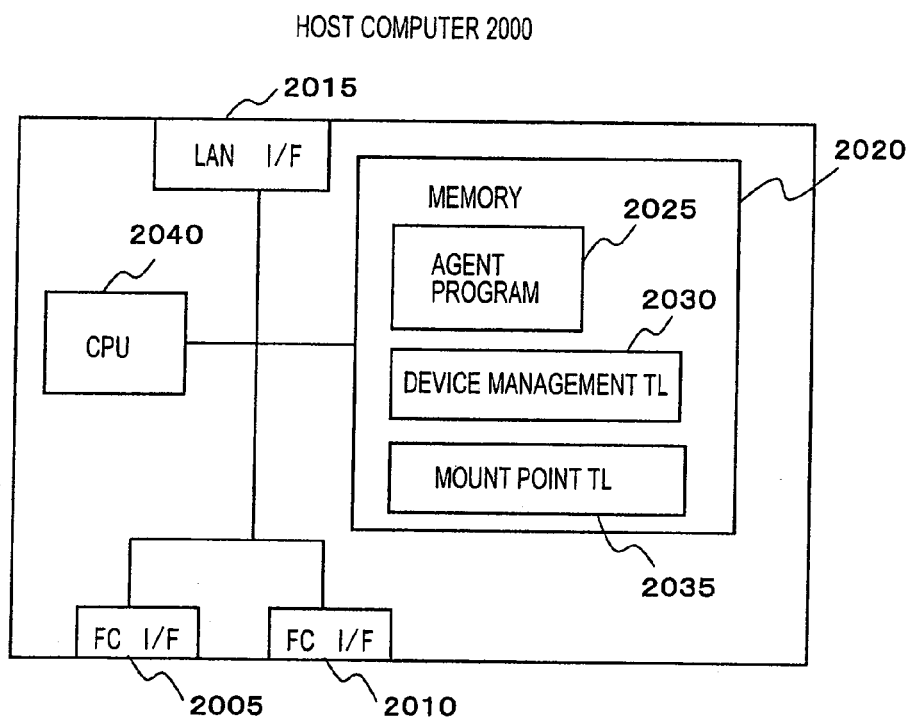
FIG. 10 is a schematic view of the host computer 2000 which is used in a second embodiment of this invention.
FIG. 11 is a view for illustrating a configuration of a device management TL 2030 that the host computers 2000, 2100 have.

FIG. 10 is a schematic view of a host computer 2000 which is used in the second embodiment of this invention. In addition, in a host computer 2100 which is used in the second embodiment of this invention, a FC I/F 2105 and a LAN I/F 2110 are provided, in lieu of the FC I/Fs 2005, 2010 and the LAN I/F 2015. Other configuration is the same as that of the host computer 2000.

As shown in the figure, in the host computers 2000, 2100 of this embodiment, in a memory 2020, stored are an agent PG 2025, a device management TL 2030, and a mount point TL 2035.

On the device management TL 2030, registered is a corresponding relation of volumes that the storage device 2400, 2500 provide, to device files that operating systems on their own host computers 2000, 2100 assign to the volumes. FIG. 11 is a view for illustrating a configuration of the device management TL 2030. As shown in the figure, on the device management TL 2030, registered are, with respect to each combination of a host port that the own host computers 2000, 2100 have and a storage port which becomes a destination of an access of the host port, a WWN 203005 of the host port, a WWN 203010 of the storage port, a LUN 203015 which is assigned to the storage port, and a device file 203020 in which operating systems of the own host computers 2000, 2100 assigned to volumes which are identified by the storage port and the LUN. The device file is an operating system which carries out abstraction of a device, in order to treat an access to a device as a file access. In an example shown in FIG. 11, to a volume which is accessed from a host port having WWN of "H1a" as LUN "0" of a storage port having WWN of "S1a", a device file of /dev/dsk/c0t0d0 is assigned.

On the mount point TL 2035, registered is a corresponding relation of a device file of a volume, and a mount point in a file system which mounts the volume. FIG. 12 is a view for illustrating a configuration of the mount point TL 2035. As shown in the figure, on the mount point TL 2035, with respect to each volume that the own host computers 2000, 2100 are accessible, registered are a device file 203505 of a volume, and a mount point 203510 on which the device file is mounted. In an example shown in FIG. 12, a volume to which a device file of "/dev/dsk/c0t0d0" is assigned is mounted on a mount point of "/usr/bin" in the file system.

The agent PG 2025 is a program for carrying out the above-described mount update process and format conversion process. The CPU 2040 carries out, by executing the agent PG 2025 which is stored in the memory 220, carries out communication with an external through the LAN I/Fs 2015, 2110 (transfer control PG 2220 of the management server 2200), update of the device management TL 2030 and the mount point TL 2035, preparation of a device file, and mount control of a file system. Also, it scans a volume which is accessible from each host port of the own host computers 2000, 2100, and collects information of each volume. In case that an operating system manages a device file, the device management TL 2030, and the mount point TL 2035, the agent PG 2025 calls for a system call, a library routine, and a standard command that an operating system provides, according to need, and realizes these functions.

(1-2) Access Restriction of Host Port with Group Unit

In the above-described first embodiment, on the new storage device 2500, in the same manner as the old storage device 2400, access restriction information is set up with a LUN unit with respect to each port (see, the port management TLs 2445, 2550 shown in FIGS. 4 and 9). On the other hand, on the new storage device 2500 of this embodiment, access restriction information is set up with a group unit of host ports with respect to each port. FIG. 13 is a view for illustrating a configuration of the port management TL 2550 of the new storage device 2500. On the port management TL 2550 of the new storage device 2500 of the first embodiment, as shown in FIG. 9, with respect to each of the port WWN 244505, registered is the access restriction information (volume ID 244515, Yes/No of access restriction 244520, access permission WWN 244525) with the LUN 244510 unit. However, on the port management TL 2550 of the new storage device 2500 of this embodiment, as shown in FIG. 13, with respect to each of the port WWN 244505, registered is access restriction information (Yes/No of access restriction 244520, LUN 244515, volume ID 244515) with the access permission WWN 244525 (a group of host ports which permit accesses) unit. In short, correspondence between a LUN and a volume is independently assigned with respect to each group of host ports. For example, in FIG. 13, to a port having WWN of "S2a", volumes having volume IDs of "Vol. X" and "Vol. Y" are assigned, both as LUN "0". In case that there is an access request from the host computers 2000, 2100 to the LUN "0" of "S2a", which volume is accessed is determined by a WWN of a source of the access. In FIG. 13, in case that an access is requested from "Hx", "Vol. X" is accessed, and in case that there is an access request from "Hy", "Vol. Y" is accessed. In order to determine a volume which corresponds to overlapping LUNs with a WWN of a source of an access, on one storage port, one host port can not belong to a plurality of groups.

In this manner, in access restriction with a group unit of host ports, flexible LUN assignment becomes possible. In this embodiment, the management server 2200 identifies which an access restriction function of the LUN unit or the group unit of host ports is provided by the transfer control PG 2220, on the basis of a device ID of each storage device 2400, 2500. Detailed particulars of a process in which the storage devices 2400, 2500 realize access restriction with a group unit of host ports by the storage control PG 2435, 2540 will be omitted since they are beyond the scope of this invention.

(2) Transfer Process Procedure (Utilization of Agent PG and Conversion of Access Restriction Information)

A transfer process procedure that the management server 2200 carries out, in case of changing a system configuration in which the host computers 2000, 2100 directly access the old storage device 2400, to a system configuration in which they access the old storage device 2400 through the new storage device 2500, will be described.

Figure 14:
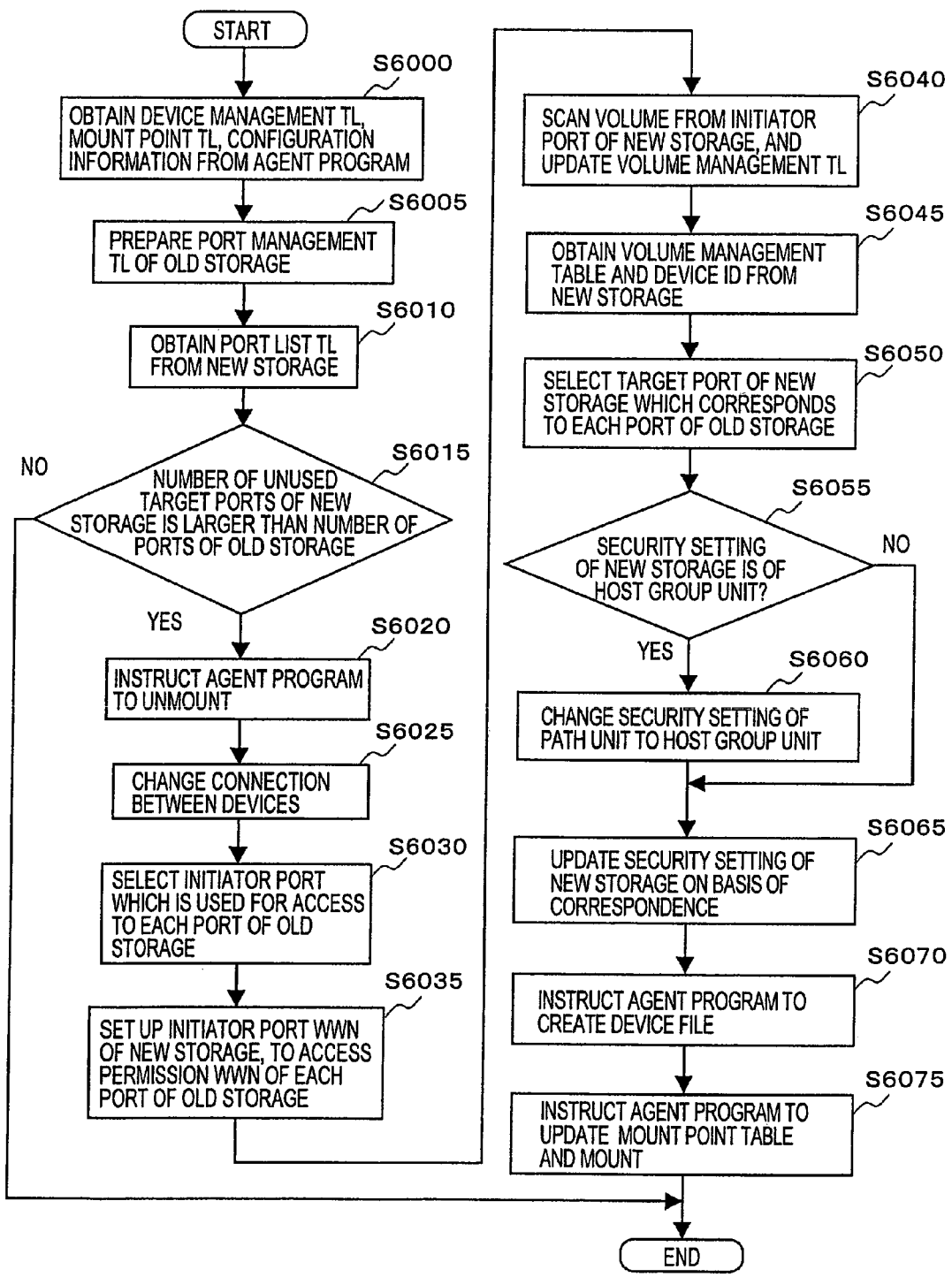
FIG. 14 is a flow chart for illustrating a transfer process that a management server 2200 carries out, in case of changing a system configuration in which host computers 2200, 2100 directly access the old storage device 2400, to a system configuration in which they access the old storage device 2400 through the new storage device 2500, in the second embodiment of this invention.

FIG. 14 is a flow chart for illustrating a transfer process that the management server 2200 carries out, in case of changing a system configuration in which the host computers 2000, 2100 directly access the old storage device 2400, to a system configuration in which they access the old storage device 2400 through the new storage device 2500, in the second embodiment of this invention. This flow is started with executing the transfer control PG 2220, in accordance with the instruction that the CPU 2205 of the management server 2200 accepted from an administrator.

Firstly, the management server 2200 obtains the device management TL 2030 and the mount point TL 2035 from each of the host computers 2000, 2100 (step S6000). Concretely speaking, the CPU 2205 of the management server 2200 transmits a device management TL request and amount point management TL request to the host computers 2000, 2100 through the LAN I/F 2210. In each of the host computers 2000, 2100, the CPU 2040, when it receives the device management TL and mount point TL requests from the management server 2200 through the LAN I/Fs 2015, 2110, it scans a volume which is accessible from a host port of its own host computers 2000, 2100, by the agent PG 2025, and transmits an Inquiry command to the volume found, and inputs a device ID and a volume ID of the storage devices 2400, 2500 having the volume. Also, it reads out the device management TL 2030, and the mount point TL 2035, from the memory 220. And, it transmits a WWN, a LUN of a storage port to which the volume is assigned, and a device ID and a volume ID which are obtained as a response of the Inquiry command to the volume, the device management TL 2030 and the mount point TL 2035 which are read out from the memory 2020, to the management server 2200 through the LAN I/Fs 2015, 2110. The CPU 2205 of the management server 2200, when it receives the WWN and LUN of the storage port, the device ID, the volume ID, the device management TL 2030, and the mount point TL 2035, from each of the host computers 2000, 2100 through the LAN I/F 2210, it prepares a configuration information TL 5000 as shown in FIG. 15 on the basis of these pieces of information. In FIG. 15, in entries 500005, 500010, and 500015, registered are a WWN of a host port, a WWN and a LUN of a storage port, which are registered on the device management TL 2030. In the entries 500015 and 500020, registered are a device ID and a volume ID which are obtained as a response of an Inquiry command to a volume which is identified by a WWN and a LUN of a storage port which is registered in corresponding entries 500010 and 500015. The CPU 2205 of the management server 2200 deletes a record having a device ID which is different from that of the old storage device 2400 which is a transfer target of access restriction information, and enables only information regarding the old storage device 2400 to be registered on the configuration information TL 5000.

Next, the CPU 2205 of the management server 2200 sorts information of the entries 500005, 500010, 500015, and 500020 of the configuration information TL 5000 shown in FIG. 15, and generates the port management TL 2445 of the old storage device 2400 (S6005). Yes/No of access restriction 244520 of the port management TL 2445 are all set up as "Yes".

Next, the management server 2200 obtains the port list TL 2555 from the new storage device 2500, in the same manner as in the step S3005 of FIG. 7 (step S6010).

Next, the management server 2200 obtains the number of storage port WWNs which are registered in the entry 500010 of the configuration information TL 5000 shown in FIG. 15, in short, the number of ports of the old storage device 2400. And, in the same manner as in the step S3010 of FIG. 7, it compares with the number of ports of a (unused) target ports which have no target port path definitions of the new storage device 2500, and judges whether a configuration change of a system is possible or not (step S6015). If the number of unused target ports of the new storage device 2500 is smaller than the number of ports of the old storage device 2400 (No in the step S6015), a transfer process is terminated. If not (Yes in the step S6015), the configuration information TL 5000 shown in FIG. 15 is transmitted to each of the host computers 2000, 2100, and unmount of a volume is instructed (step S6020). The CPU 2040 of the host computers 2000, 2100 refers to the device management TL 2030 and the mount point TL 2035 which are stored in the memory 2020, with the agent PG 2025, and specifies a mount point which corresponds to a volume indicated by a WWN of a host port, a WWN and a LUN of a storage port, which are registered on the configuration information TL 5000 which has been received by the management server 2000, and unmounts an operating system a file system which has been mounted.

Steps S6025 to S6050 are the same as the steps S3015 to S3040 shown in FIG. 7. In this regard, however, the step S6045 is different from the step S3035, and also obtains a device ID of the new storage device 2500.

Next, the CPU 2205 of the management server 2200 judges whether an access restriction function of the new storage device 2500 is of a group unit of host ports or not (step S6055), on the basis of a device ID which is obtained from the new storage device 2500 in S6045 and a type of access restriction function which has been registered in advance, for example, with respect to each device ID. In case that the new storage device 2500 is a storage device which carries out access restriction with LUN unit, the flow goes to a step S6065, and a process, which is the same as in the step S3045 shown in FIG. 7, is carried out. On the other hand, in case that the new storage device 2500 carries out access restriction with a group unit of host ports, the flow goes to a step S6060.

In the step S6060, the CPU 2205 of the management server 2200 converts the port management TL 2445 of the old storage device 2400, which is generated in the step S6005, into a table which is of the same format as the port management TL 2550 of the new storage device 2500 shown in FIG. 13. In order to do that, as shown in FIG. 16, with respect to each storage port of the old storage device 2400, a correspondence TL (table) of a LUN to a WWN of a host port which is permitted to access is prepared. FIGS. 16A and 16B show correspondence TLs which are prepared regarding ports having WWNs of "S1a", "S1b", of the port management TL 2445, respectively. In FIG. 16A, in an entry 7000, registered is a LUN which is assigned to a storage port having a WWN of "S1a". In entries 7005, 7010, and 7015, registered is to which LUN each of host ports having WWNs of "H1a", "H1b", "H2" is accessible. A circular mark shows that it is possible to access a LUN, and a blank show that it is not possible to access. These tables can be prepared from the port management TL 2445 shown in FIG. 4, which is prepared in the step S6005. In short, in case of preparing a correspondence TL of a certain storage port, with respect to each LUN of the entry 244510 which corresponds to the entry 244505 in which a WWN of the port is registered, the entry 244525, which corresponds to the entry 244510, may be investigated, and a circular mark may be given to a host port whose WWN is registered in the entry 244525. On the correspondence TL, in case that WWNs of a plurality of host ports to which circular marks are given corresponding to the same LUN, this plurality of host ports can be put into one group. For example, in FIG. 16A, a host port having a WWN of "H1b" and a host port having a WWN of "H2" are put into one group. Also, in FIG. 16B, a host port having a WWN of "H1a" and a host port having a WWN of "H2" are put into one group. When a host group is determined, it is possible to easily convert the port management TL 2445 into a table of the same form as the port management TL 2550 of the new storage device 2500 shown in FIG. 13. In short, with regard to a certain storage port, a WWN of the storage port is registered in an entry 255055, and with respect to each group of host ports, an entry 255060 is provided, and a WWN of each host port, which belongs to a group corresponding to each entry 255060, is registered. Also, in entries 255065, 255070, and 255075 which are disposed with respect to each entry 255060, registered are "Yes" of Yes/No of access restriction, a LUN which corresponds to a group of host ports which is registered in corresponding entry 255060, and a volume ID which is specified by a WWN and a LUN of a storage port which are registered in corresponding entries 255055, 255070.

Next, the CPU 2205 of the management server 2200, by use of access restriction information which is configured with a unit of a group of host ports, updates the port management TL 2550 of the new storage device 2500 (step S6065). With respect to each target port of the new storage device 2500 which is selected in the step S6050, information is copied from the port management TL 2445 of the old storage device 2400 whose format is converted. Also, in the same manner as in the step S3045 shown in FIG. 7, a volume ID is changed to a volume ID used on the new storage device 2500.

By the steps which have been described up to here, the transfer process of access restriction information is completed. However, in this embodiment, information regarding mount of a file system on the host computers 2000, 2100 is further updated. A volume whose access path (route) is changed by the transfer process can not be accessed by an existing device file. The CPU 2205 (transfer control PG 2220) of the management server 2200 instructs the CPU 2040 (agent PG 2025) of the host computers 2000, 2100 to recognize with a new path and to prepare a device file (step S6070). In each of the host computers 2000, 2100, the CPU 2040, when it receives this, by the agent PG 2025, scans a volume which is accessible from a host port that itself has, by use of a function that an operating system provides. Then, a device file of a volume which is not registered on the device management TL 2030, i.e., the volume which has newly been found is prepared, and is added to the device management TL 2030.

Next, the CPU 2205 of the management server 2200 transmits the volume management TL 2545 and a device ID which are obtained from the new storage device 2500 in the step S6045, to the host computers 2000, 2100, and instructs the CPU 2040 (agent PG 2025) of each of the host computers 2000, 2100, so as to change a device file which is registered on the mount point TL 2035 to a device file which has newly been filed (S6075). The CPU 2040 of each of the host computers 2000, 2100, when it receives this, by the agent PG 2025, carries out a mount update process, to a combination of a WWN and a LUN of a storage port which is registered in mutually corresponding entries 500010, 500015 of the device management TL 2030.

Figure 17:
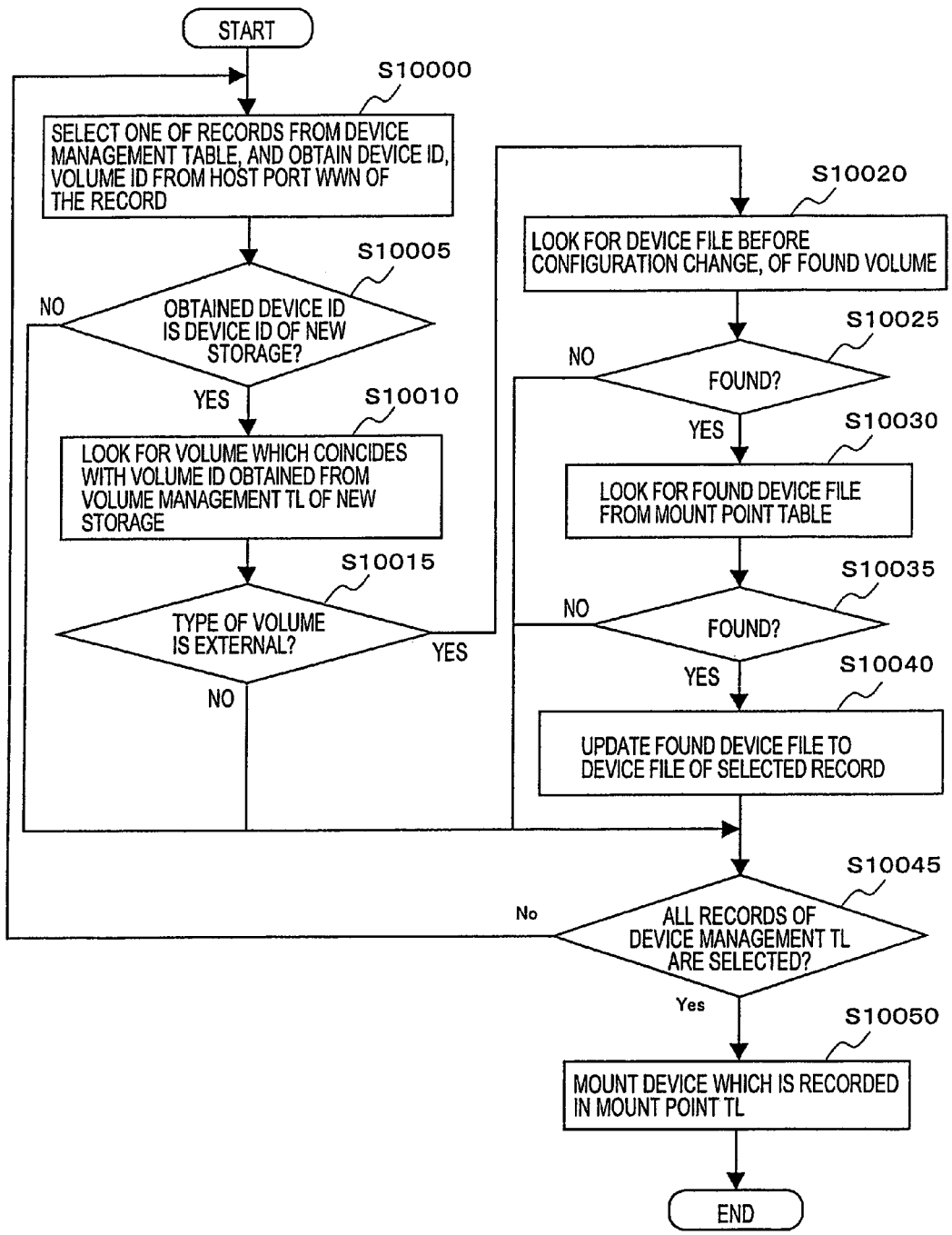
FIG. 17 is a flowchart for illustrating a mount update process that the host computers 2000, 2100 carry out, in the second embodiment of this invention.

FIG. 17 is a flow chart for illustrating that mount update process that the host computers 2000, 2100 carry out, in the second embodiment of this invention.

In each of the host computers 2000, 2100, the CPU 2040 (agent PG 2025) selects one of records (a combination of WWN of a host port, WWN, LUN of a storage port and a device file) from the device management TL 2030 which is registered on the memory 2020, and issues an Inquiry command from a WWN of a host port of the selected record, and obtains a device ID and a volume ID (step S10000). Next, the CPU 2040 compares the obtained device ID with a device ID (S6075 of FIG. 14) which is received from the management server 2200 (transfer control PG 2220) (S10005). In case that both of them differ (No in S10005), if there is a record which is not selected from the device management TL 2030 (No in S10045), the flow goes back to S10000 to continue a process. However, if both of them coincide (Yes in S10045), the obtained volume ID is scanned from volume IDs which are registered in the entry 254510 of the volume management TL 2545 (S6075 of FIG. 14) which is received from the management server 2200 (transfer control PG 2220) (step S10010).

Next, the CPU 2040 checks a volume type which is registered in the entry 254515 which corresponds to the entry 254510 of the detected volume ID (S10015). If a volume type is "internal" (No in S10015), if there is a record which is not selected from the device management TL 2030 (No in S10045), the flow goes back to S10000 to continue a process. However, in case that a volume type is "external" (Yes in S10015), a combination of a WWN, an external connection LUN of an external port which is registered in entries 254525, 254530 which correspond to the entry 25410 of the detected port ID, i.e., a WWN, a LUN of a storage port of the old storage device 2400, and a WWN of a host port which issued an Inquiry command is compared with a combination of a WWN, a LUN of a storage port which is registered on the device management TL 2030, and a WWN of a host port, and a combination to be matched is detected from the device management TL 2030. And, a device file, which corresponds to the detected combination, is tried to be found (step S10020). If the device file is not found (No in S10025), if there is a record which is not selected from the device management TL 2030 (No in S10045), the flow goes back to S10000 to continue a process.

In case that the corresponding device file is found from the device management TL 2030 (Yes in S10025), this device file is prepared in the configuration that a volume of the old storage device 2400 is recognized from the host computers 2000, 2100 without passing through the new storage device 2500 (configuration shown in FIG. 1A). This device file can not be used in a system after configuration change (configuration shown in FIG. 1B). On this account, there is a necessity to substitute it with a new device file. In this connection, the CPU 2040 looks for this device file, from the mount point TL 2035 (step S10030). In case that this device file is not registered on the mount point TL 2035 (No in S10035), since there is no mount point which corresponds to this device file, there is no necessity to update the mount point TL 2035. In this case, if there is a record which is not selected from the device management TL 2030 (No in S10045), the flow goes back to S10000 to continue a process.

In case that the device file, which is found from the device management TL 2030, is registered on the mount point TL 2035 (Yes in S10035), this device file, which is registered on the mount point TL 2035, is updated to a device file of a record, which is registered on the device management TL 2030, and which is selected in the step S10000 (step S10040). The above-described process is repeated with respect to WWNs of all host ports which are registered on the device management TL 2030 (step S10045).

Finally, the CPU 2040 mounts a device in accordance with the updated mount point TL 2035, by a function of an operating system which receives an instruction from the agent PG 2025 (step S10050). With this process, a volume of the old storage device 2400 can be mounted on the same mount point so as to access through the new storage device 2500, also after a system configuration has been changed.

As above, the second embodiment of this invention has been described. According to this embodiment, in addition to the above-described advantage of the first embodiment, it has the following advantage. That is, even in case that the management server 2200 does not obtain the port management TL 2445 from the old storage device 2400, by utilizing the agent PG 2025 on the host computers 2000, 2100, it is possible to carryout the transfer process. Also, even in case that an access restriction function of the old storage device 2400 and the new storage device 2500 are different from each other, it is possible to convert access restriction information of the old storage device 2400 into a format which is suitable for the new storage device 2500 and then, to transfer the same. Furthermore, it is possible to maintain correspondence of a volume to amount point of the old storage device 2400, even after system configuration change.

In addition, in this embodiment, in order to maintain correspondence of a volume to a mount point, information of an old device file is updated to information of a new device file. However, the same process is applicable to management other than mount point, e.g., device management of Logical Volume Manager which realizes virtualization of a volume.

<<Third Embodiment>>

Next, a third embodiment of this invention will be described. In this embodiment, by utilizing an alternative path which is set up between the host computers 2000, 2100 and the old storage device 2400, without stopping operations of the host computers 2000, 2100, the transfer process is carried out. The alternative path is a mechanism in which a plurality of paths, which access a certain volume from a host computer, are provided, and an access is continued by use of another path in case that there occurs a trouble in one path. In order to avoid the state that all paths become unavailable due to a trouble of one port, each path, which can be alternative, uses a host port and a storage port which are different from each other.

(1) System Configuration

A system configuration of this embodiment is the same as in the first embodiment shown in FIG. 2. In this regard, however, host computers 2000, 2100 are different from those in the first embodiment.

(1-1) Host Computer

Figures 18, 19:
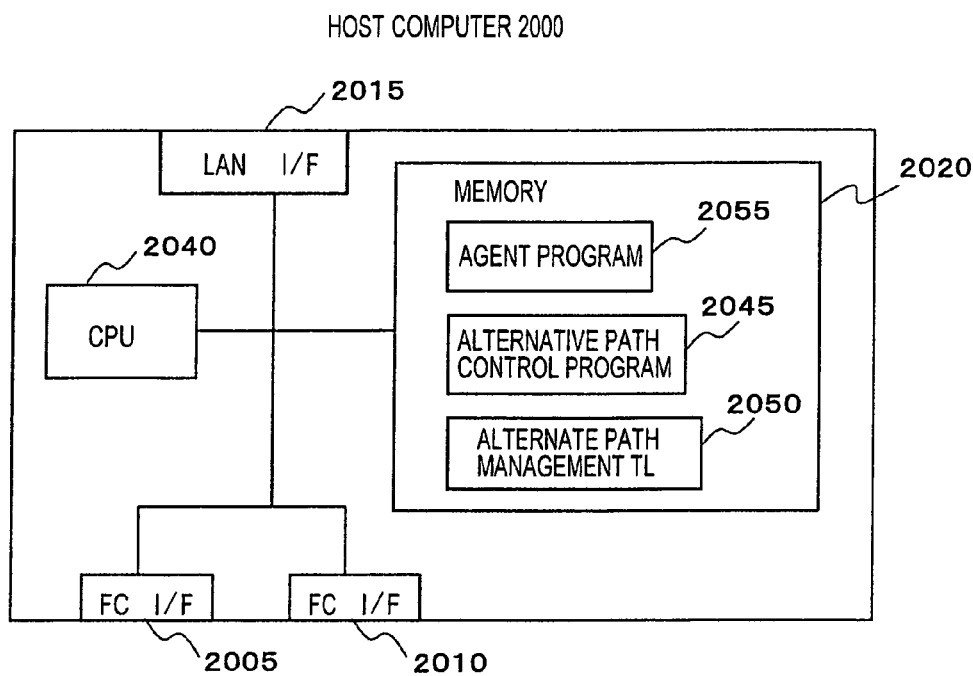
FIG. 18 is a schematic view of a host computer 2000 which is used in a third embodiment of this invention.
FIG. 19 is a view for illustrating a configuration of an alternative path management TL 2050 that host computers 2000, 2100 have.

FIG. 18 is a schematic view of a host computer 2000 which is used in the third embodiment of this invention. In addition, in a host computer 2100 which is used in the third embodiment of this invention, a FC I/F 2105 and a LAN I/F 2110 are provided, in lieu of the FC I/Fs 2005, 2010 and the LAN I/F 2015. Other configuration is the same as that of the host computer 2000.

As shown in the figure, in the host computers 2000, 2100 of this embodiment, in a memory 2020, an agent PG 2025, an alternative path control PG 2045, and an alternative path management TL 2050 are stored.

On the alternative path management TL 2050, a correspond relation of a path to each volume that the storage devices 2400, 2500 provide and its alternative path are registered. FIG. 19 is a view for illustrating a configuration of the alternative path management TL 2050. As shown in the figure, on the alternative path management TL 2050, with respect to each path that its own host computers 2000, 2100 can utilize, registered are a path number 205005 which is a sequential serial number of the path, a WWN 205010 of a host port that the path uses, a WWN 205015 and a LUN 205020 of a storage port of a volume which can be accessed by the path, and an alternative path number 205025 which is a path number of a path which can be utilized as an alternative path of the path. In an example shown in FIG. 19, a path having a path number of "1" is a path which accesses a LUN "0" of a storage port having a WWN of "S1a" from a host port having a WWN of "H1a", and a path number of an alternative path is "2".

The alternative path control PG 2045 is a program for controlling an alternative path. The CPU 2040, by executing the alternative path control PG 2045 which is stored in a memory 2020, controls a path and an alternative path which are used for an access to a volume. For example, in case that its own host computers 2000, 2100 transmit commands and data to the storage devices 2400, 2500, if an alternative path is set up to a path which is used for transmission, one of these two paths is selected and used for transmission. Also, in case that transmission is failed while each path is being monitored, and transmission fails, a path is switched with reference to the alternative path management TL 2050, and transmission is carried out again through the switched path. In addition, selection and switching of a path by use of the alternative path control PG 2045 are carried out transparently from a program which calls for transmission of a command and data.

An agent PG 2055 is a program for carrying out management of alternative path. The CPU 2040, by executing the agent PG 2055 which is stored in the memory 2020, carries out registration, update and transmission of the alternative path management TL 2050.

(2) Procedure of Transfer Process (Utilization of Alternative Path)

Procedure of transfer process that the management server 2200 carries out in case of changing a system configuration in which the host computers 2000, 2100 directly access the old storage device 2400, to a system configuration in which they access the old storage device 2400 through the new storage device 2500, will be described.

Figure 20:
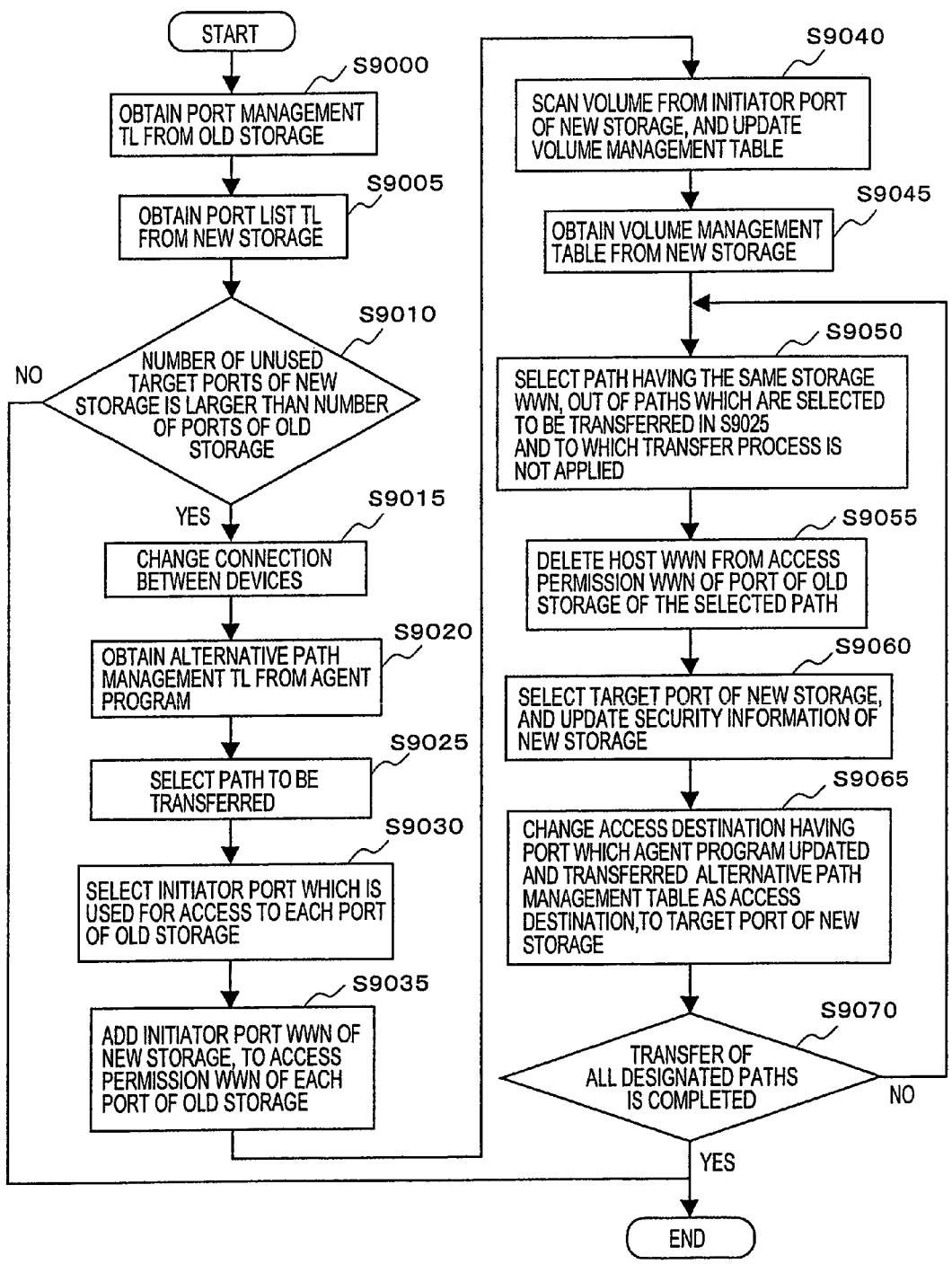
FIG. 20 is a flow chart for illustrating a transfer process that a management server 2200 carries out, in case of changing a system configuration in which host computers 2200, 2100 directly access the old storage device 2400, to a system configuration in which they access the old storage device 2400 through the new storage device 2500.

FIG. 20 is a flow chart for illustrating the transfer process that the management server 2200 carries out, in case of changing a system configuration in which the host computers 2000, 2100 directly access the old storage device 2400, to a system configuration in which they access the old storage device 2400 through the new storage device 2500. This flow is started with executing the transfer control PG 2220, in accordance with an instruction that the CPU 2205 of the management server 2200 received from an administrator.

Steps S9000 to S9015 are the same as the steps S3000 to S3015 shown in FIG. 7 of the first embodiment. In this regard, however, in the step S9015, in order to continue operations of the host computers 2000, 2100, a zone of the FC SW 2300 is set up so as for the host computers 2000, 2100 to be able to access the old storage device 2400.

Next, in the management server 2200, the CPU 2205 obtains an alternative path management TL 2050 from the host computers 2000, 2100 (S9020). Concretely speaking, the CPU 2205 transmits an alternative path management TL request to the host computers 2000, 2100 through the LAN I/F 2210. With respect to each of the host computers 2000, 2100, the CPU 2040, when it receives the alternative path management TL request from the management server 2200, reads out the alternative path management TL 2050 from the memory 2020 with the agent PG 2055, and transmits it to the management server 2200. By this, the CPU 2205 of the management server 2200 receives the alternative path management TL 2050.

Next, the CPU 2205 of the management server 2200 selects a path to be transferred, out of the alternative path management TL 2050 which is obtained from the host computers 2000, 2100 (S9025). Judgment of a path to be transferred is carried out as follows. That is, with reference to the port management TL 2445 which is obtained from the old storage device 2400 in the step S9000, it is confirmed whether a WWN of a storage port which is registered in the entry 205015 of the alternative path management TL 2050 is a WWN of a port of the old storage device 2400 or not. And, all paths, whose path numbers are registered on the alternative path management TL 2050 of the host computers 2000, 2100 in association with the WWN of the confirmed storage port, are set as paths to be transferred.

Steps S9030 to S9045 are the same as the steps S3020 to S3035 shown in FIG. 7 of the first embodiment. In this regard, however, in the step S9035, in order that the host computers 2000, 2100 can access the old storage device 2400, on the port management TL 2445 of the old storage device 2400, WWNs of host ports of the host computers 2000, 2100 are remained unchanged in the entry 244525 as access permission WWN. Also, a WWN of an initiator port of the new storage device 2500 which is utilized for an access to a volume having a volume ID registered in the entry 244515 is added to the access permission WWN of an entry 244525 which is associated with the entry 244515 in which the volume ID is registered.

In steps S9050 to 9070, the transfer process is carried out over switching an alternative path with respect to each port of the old storage device 2400, and a process for updating the alternative path management TL 2050 which relates to the port is repeated with respect to all paths to be transferred, which are selected in the step.

Firstly, in the step S9050, the CPU 2205 of the management server 2200 selects one of paths to which the transfer process is not applied, out of paths which are selected in the step S9025.

Next, in the step S9055, the CPU 2205 of the management server 2200, with reference to the entry 205015 of the alternative path management TL 2050 in which the selected path is registered, specifies a WWN of a storage port of the selected path. Also, a path other than the selected path, in which the WWN is registered in the entry 205015 is tried to be found from the alternative path management TL 2050 which is obtained from the host computers 2000, 2100. And then, the CPU 2205 of the management server 2200 transmits a combination of a WWN of a host port and a WWN of a storage port in each path found, which are registered on the alternative path management TL 2050 obtained from the host computers 2000, 2100, to the old storage device 2400 through the LAN I/F 2210. The CPU 2425 of the old storage device 2400, when it receives this, with the storage control PG 2435, with respect to each combination of a WWN of a host port and a WWN of a storage port which are received through the LAN I/F 2415, deletes a WWN of a host port of the combination, from the entry 244525 of the access permission WWN which corresponds to the entry 244505 in which a WWN of a storage port of the combination is registered, on the port management TL 2445.

Therefore, on the port management TL 2445, in the access permission WWN which corresponds to a WWN of a storage port of the combination, only a WWN of an initiator port of the new storage device 2500 which is selected in the step S9030 remains. As a result of this, the old storage device 2400 rejects an access to the storage port from the host computers 2000, 2100. In case that the host computers 2000, 2100 are in use of this storage port, the CPU 2040 of the host computers 2000, 2100 detects an access failure with the alternative path control PG 2045, and switches a path to an alternative path. On this account, there is no case that operations of the host computers 2000, 2100 are stopped.

A step S9060 is the step that the steps S3040, S3045 shown in FIG. 7 of the first embodiment are put into one group. In this regard, however, only a storage port of a path which is selected in the step S9050 is processed.

In a step S9065, the CPU 2205 of the management server 2200 changes a WWN of a storage port (storage port of the old storage device 2400) of each of the paths which are registered on the alternative path management TL 2050 obtained from the host computers 2000, 2100 and which are found in the step S9050 to a WWN of an initiator port of the new storage device 2500 which is selected in the step S9030. Also, a changed content of the corresponding alternative path management TL 2500 is notified to the host computers 2000, 2100. The CPU 2040 of the host computers 2000, 2100, when it receives this, updates the alternative path management TL 2050 which is registered in the memory 2020 in accordance with the changed content which is notified from the management server 2200.

The CPU 2040 of the management server 2200, if there remains a path to which the transfer process is not applied, among paths which are selected in the step S9025, returns to S9050 and repeats the process (step S9070).

As above, the third embodiment of this invention has been described. According to this embodiment, in addition to the above-described advantage of the first embodiment, it has the following advantage. In case that the host computers 2000, 2100 have a plurality of paths which are used for an access to the same volume, the transfer process to the volume is carried out at least twice separately to the plurality of paths. That is, access restriction information of a port is transferred stepwise over switching alternative paths, and the transfer process can be carried out without stopping operations of the hose computers 2000, 2100.

In addition, this invention is not limited to each embodiment, and various modifications are possible within a scope of its substance. For example, in the above-described each embodiment, the case of changing from a system configuration in which the host computers 2000, 2100 directly access the old storage device 2400, to a system configuration in which they access the old storage device 2400 through the new storage device 2500 has been described as an example. However, this invention is not limited to these embodiments. The transfer process of access restriction information of this invention is applicable to a case of changing from a system configuration in which the host computers 2000, 2100 access the old storage device 2400, to a system configuration in which they access the new storage device 2500, by transferring data of the old storage device 2400 to the new storage device 2500.

What is claimed is:

1. A storage system comprising:
    a host computer;
    a management computer coupled to the host computer;
    a first storage device coupled to the host computer and the management computer, and including first port management information; and
    a second storage device coupled to the host computer, the management computer and the first storage device, and including second port management information;
    wherein the first port management information and the second port management information include an identifier of a port on each storage device, an identifier of a volume in each storage device, an access restriction and an identifier of a port permitted access from the host computer to each storage device, and
    wherein the management computer is configured to:
        transfer a volume from the first storage device to the second storage device;
        set the second port management information so that the access restriction and the identifier of the port corresponding to the identifier of the transferred volume are changed to permit the second storage device to be accessed by the port which is permitted access from the host computer to the first storage device; and
        set the first port management information so that the access restriction and the identifier of the port corresponding to the identifier of the transferred volume are changed to be canceled.

2. A storage management method for a storage system comprising:
    a host computer;
    a management computer coupled to the host computer;
    a first storage device coupled to the host computer and the management computer, and including first port management information; and
    a second storage device coupled to the host computer, the management computer and the first storage device, and including second port management information;
    wherein the first port management information and the second port management information include an identifier of a port on each storage device, an identifier of a volume in each storage device, an access restriction and an identifier of a port permitted access from the host computer to each storage device,
    the storage management method comprising the steps of:
    transferring a volume from the first storage device to the second storage device;
    setting the second port management information so that the access restriction and the identifier of the port corresponding to the identifier of the transferred volume are changed to permit the second storage device to be accessed by the port which is permitted access from the host computer to the first storage device; and setting the first port management information so that the access restriction and the identifier of the port corresponding to the identifier of the transferred volume are changed to be canceled.

\* \* \* \* \*